United States Patent
Thomas et al.

(10) Patent No.: US 7,567,844 B2
(45) Date of Patent: Jul. 28, 2009

(54) BUILDING MANAGEMENT SYSTEM

(75) Inventors: Robert J. Thomas, Brier, WA (US);
Neal A. Anderson, Redmond, WA (US);
Stuart G. Donaldson, Bothell, WA (US); Mark A. Behar, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 502 days.

(21) Appl. No.: 11/276,910

(22) Filed: Mar. 17, 2006

(65) Prior Publication Data
US 2007/0219645 A1 Sep. 20, 2007

(51) Int. Cl.
*H04N 7/18* (2006.01)
*G06K 9/00* (2006.01)
*G05B 11/01* (2006.01)
*G05B 15/00* (2006.01)
*G06F 11/00* (2006.01)
*G06F 17/50* (2006.01)
*G06F 7/00* (2006.01)
*G06F 17/30* (2006.01)
*G06F 3/048* (2006.01)
*G01M 1/38* (2006.01)
*G05B 13/00* (2006.01)
*G05D 23/00* (2006.01)

(52) U.S. Cl. .......................... 700/19; 382/154; 700/17; 700/83; 700/276; 702/188; 703/1; 707/10; 707/102; 707/104.1; 715/740; 715/771; 348/143

(58) Field of Classification Search ................... 700/17, 700/19, 83, 180, 182, 275, 276; 702/186, 702/188; 703/1; 705/1, 7, 8, 9, 15, 27, 28; 707/2–4, 9, 10, 100, 102, 104.1; 709/208, 709/217, 223, 224; 715/255, 700, 733, 740, 715/741, 771–773; 340/3.1, 3.5, 3.9, 531; 345/1.1, 2.1, 156, 419; 348/49, 50, 73, 142, 348/143, 159; 382/104, 154

See application file for complete search history.

(56) References Cited

U.S. PATENT DOCUMENTS 5,745,126 A * 4/1998 Jain et al. .................... 382/154
6,334,211 B1 * 12/2001 Kojima et al. ............... 717/128
6,876,951 B2 * 4/2005 Skidmore et al. ........... 702/186

(Continued)

FOREIGN PATENT DOCUMENTS

JP      07085166 A * 3/1995

(Continued)

OTHER PUBLICATIONS http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
Sharp, "Actius AL3DU 3D LC Display High Performance 3D Visualization," 2 pages, prior to Mar. 17, 2006.

*Primary Examiner*—Crystal J Barnes-Bullock

(57) ABSTRACT

A building management system for one or more buildings, having a processor and a display for showing a model of a building being managed. The model may be shown as a three dimensional depiction or rendition, or a virtual building. A database may provide information regarding sensors, actuators and other items which may be viewed in conjunction with the displayed model. Information regarding the location and status of the sensors, control devices, and the like, which may be points of interest, may be mapped on the virtual depiction or model of the building. A user or operator may thus move through the building and view and affect rooms, sensing and control devices, and other items, including quick navigation to points of interest, in virtual reality. A recorder and play mechanism may be a significant portion of the system for recording structures, parameters, environment, events and other information of the system.

40 Claims, 16 Drawing Sheets

U.S. PATENT DOCUMENTS

| | | | |
|---|---|---|---|
| 7,062,722 B1 * | 6/2006 | Carlin et al. | 715/850 |
| 7,139,685 B2 * | 11/2006 | Bascle et al. | 703/1 |
| 7,200,639 B1 * | 4/2007 | Yoshida | 709/208 |
| 7,292,908 B2 * | 11/2007 | Borne et al. | 700/182 |
| 2003/0083957 A1 * | 5/2003 | Olefson | 705/27 |
| 2003/0214400 A1 * | 11/2003 | Mizutani et al. | 340/531 |
| 2004/0233192 A1 * | 11/2004 | Hopper | 345/419 |
| 2005/0010460 A1 * | 1/2005 | Mizoguchi et al. | 705/7 |
| 2005/0252984 A1 | 11/2005 | Ahmed | |
| 2005/0267900 A1 * | 12/2005 | Ahmed et al. | 707/100 |
| 2005/0268629 A1 | 12/2005 | Ahmed | |
| 2005/0275525 A1 | 12/2005 | Ahmed | |
| 2005/0278047 A1 | 12/2005 | Ahmed | |
| 2005/0289467 A1 | 12/2005 | Imhof et al. | |
| 2006/0004841 A1 * | 1/2006 | Heikkonen et al. | 707/102 |
| 2006/0009862 A1 | 1/2006 | Imhof et al. | |
| 2006/0010388 A1 | 1/2006 | Imhof et al. | |
| 2006/0029256 A1 * | 2/2006 | Miyoshi et al. | 382/104 |
| 2006/0075718 A1 | 4/2006 | Borne et al. | |
| 2006/0077255 A1 * | 4/2006 | Cheng | 348/143 |
| 2006/0136180 A1 * | 6/2006 | Hansen et al. | 703/1 |
| 2006/0265664 A1 * | 11/2006 | Simons et al. | 715/772 |
| 2006/0279630 A1 * | 12/2006 | Aggarwal et al. | 348/143 |
| 2007/0219645 A1 | 9/2007 | Thomas et al. | |
| 2008/0062167 A1 * | 3/2008 | Boggs et al. | 345/419 |

FOREIGN PATENT DOCUMENTS

| | | | |
|---|---|---|---|
| JP | 11024735 A | * | 1/1999 |
| JP | 11317936 A | * | 11/1999 |
| JP | 2001356813 A | * | 12/2001 |
| JP | 2005242531 A | * | 9/2005 |
| JP | 2005311563 A | * | 11/2005 |

* cited by examiner

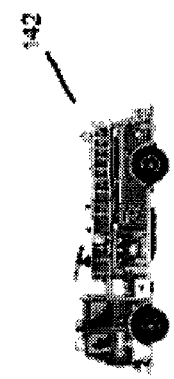
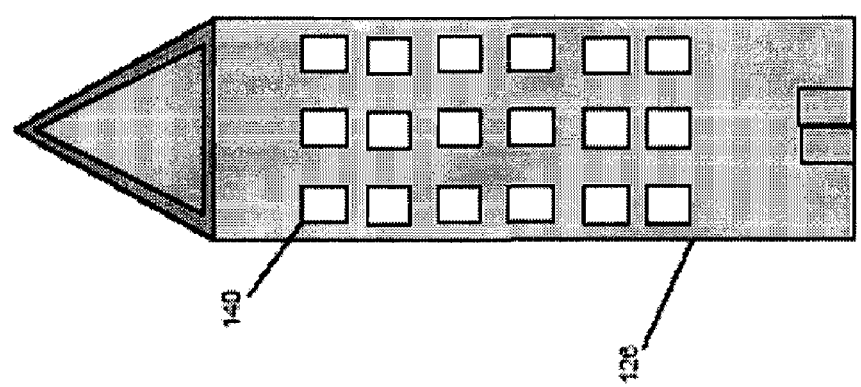
FIGURE 6
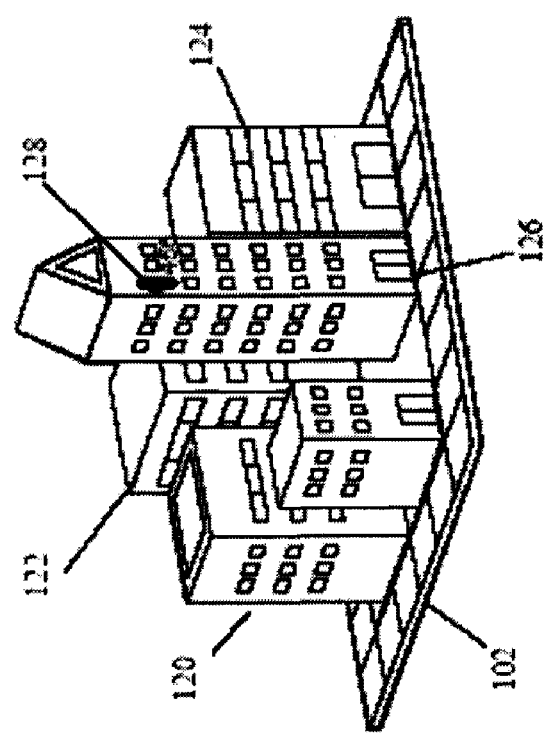
FIGURE 5

US 7,567,844 B2

BUILDING MANAGEMENT SYSTEM

BACKGROUND

The invention pertains to management systems and particularly to building management systems. More particularly, the invention pertains to management systems for buildings remotely located relative to the system.

SUMMARY

The invention is a building information and management system for one or more buildings.

BRIEF DESCRIPTION OF THE DRAWING

FIG. 5 shows a campus level view for the building management system;

FIG. 6 shows a building level view for the building management system;

DESCRIPTION

The invention is a building management system for one or more buildings. The buildings may be located at various places in the world. The management system may have processor and display which may select and present a 3 dimensional or 3-dimensional render in 2 dimensional format of a model, in color or grayscale or black and white, with associated information in video, graphics, text, audio, and so forth, of the building being looked at. Various parameters of the subject building may be monitored. There may also be alarms that provide signals to the management system. Also, the management system may control actuators as needed. The system information, in various forms, may be recorded and played back as needed. Information related to the building or buildings, its parameters, operations and associated events, may be recorded, saved in a memory, and played back. Recording media may include video and audio disks, memory sticks, CD's, tapes, and other types of information and data retention, recording and playback technologies.

Building management systems may allow a person to monitor various devices within a building. For example, air handlers, chillers, sensors and security systems may be monitored by a central building controller.

Figure 1:
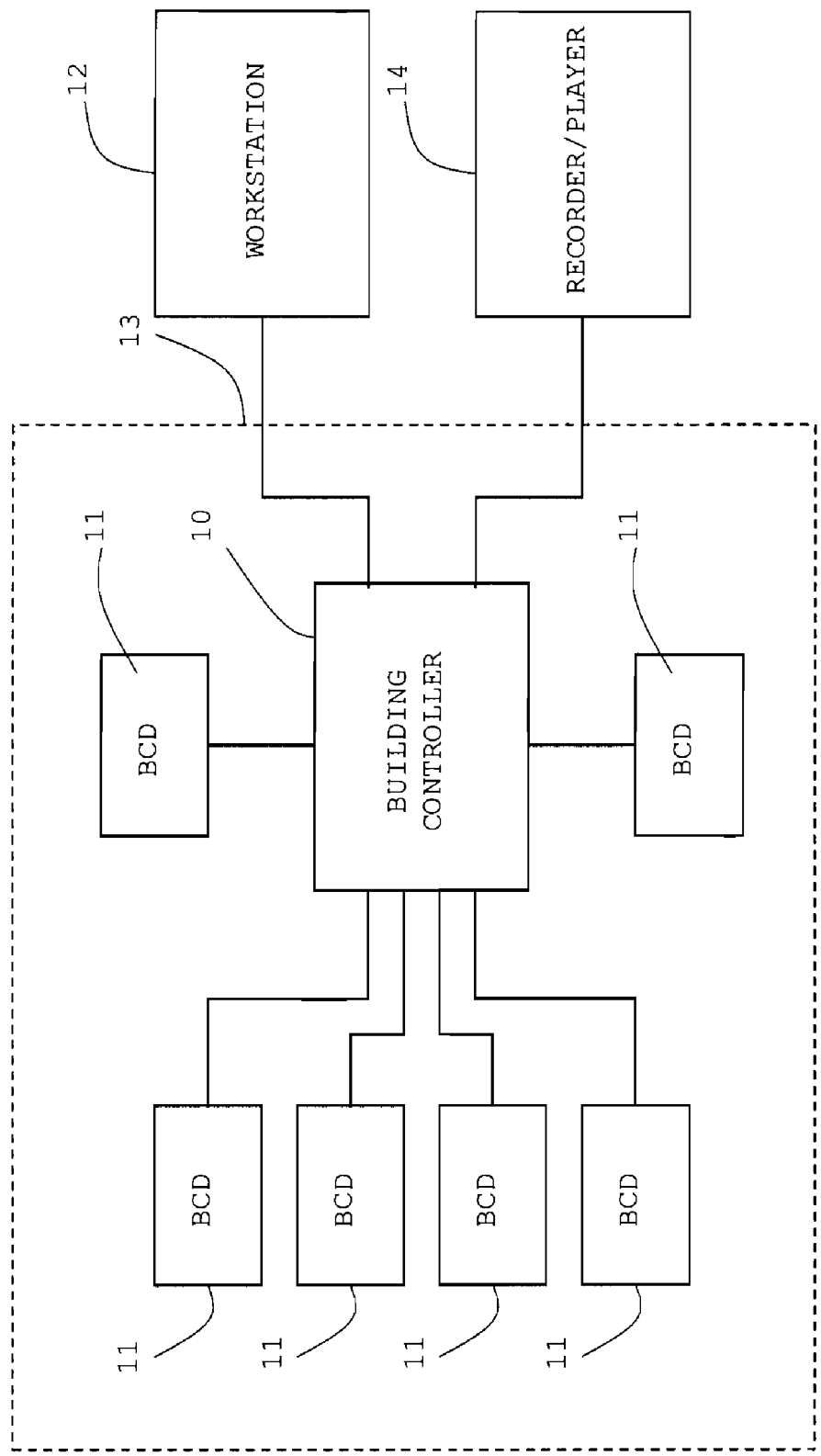
FIG. 1 shows a basic building management system.

FIG. 1 shows a basic building management system. A variety of building management or control devices (BCDs) 11 may be present within a building 13. BCDs 11, as used herein, may refer to many different devices, such as sensors, actuators, air handlers, chillers, steam plants, security systems, smoke detectors, and lighting systems that are used to monitor and control building 13. While just a few BCDs 11 are shown in FIG. 1, it is understood that a plethora of BCDs may be present in a building. For example, a large office building may have a thousand or more thermostats.

The BCDs 11 may be connected to building controller 10. The connection between the BCDs and building controller 10 may be unidirectional where information is merely provided to controller 10, or it may be bi-directional, allowing the controller to operate or manipulate the BCDs 11 in some manner. For example, if a BCD 11 is an air handler, the air handler may provide information to the building controller 10 regarding its operating status. Building controller 10 may also give commands to the air handler such as to increase the rate of air flow.

Building controller 10 may then be connected to workstation 12. Workstation 12 may be in the same building as building controller 10 or it could be at a remote location. Building controller 10 may monitor various BCDs 11 and provide the status of the BCDs to workstation 12. Workstation 12 may then be used to view the operation of any of the BCDs 11 or issue commands to the BCDs. A recorder/player 14 may be connected to the building controller 10 and workstation 12 for recording activities, parameters, structures, changes, happenings, and so forth of the building management system.

While such a system may be proven effective for many buildings, the system could be improved. First, accessing individual BCDs may be difficult. The specific address of the device may be required. Second, even after access to the BCD 11 is obtained, it may be difficult to determine the context for the information from the BCD 11. For example, a thermostat near a window could have a temperature indicating that the window was open. However, the information as to its physical location and building features near the sensor are not known. Third, understanding the relationship of readings by different BCDs in one location is not necessarily readily apparent. For example, a thermostat indicating a high temperature reading and an air flow sensor showing a high volume of air movement might indicate a fire, and yet the lack of knowing the proximity of the thermostat to the air flow sensor may hinder a correct interpretation of the readings. Thus, a more extensive building management system may be highly desirable.

Figure 2:
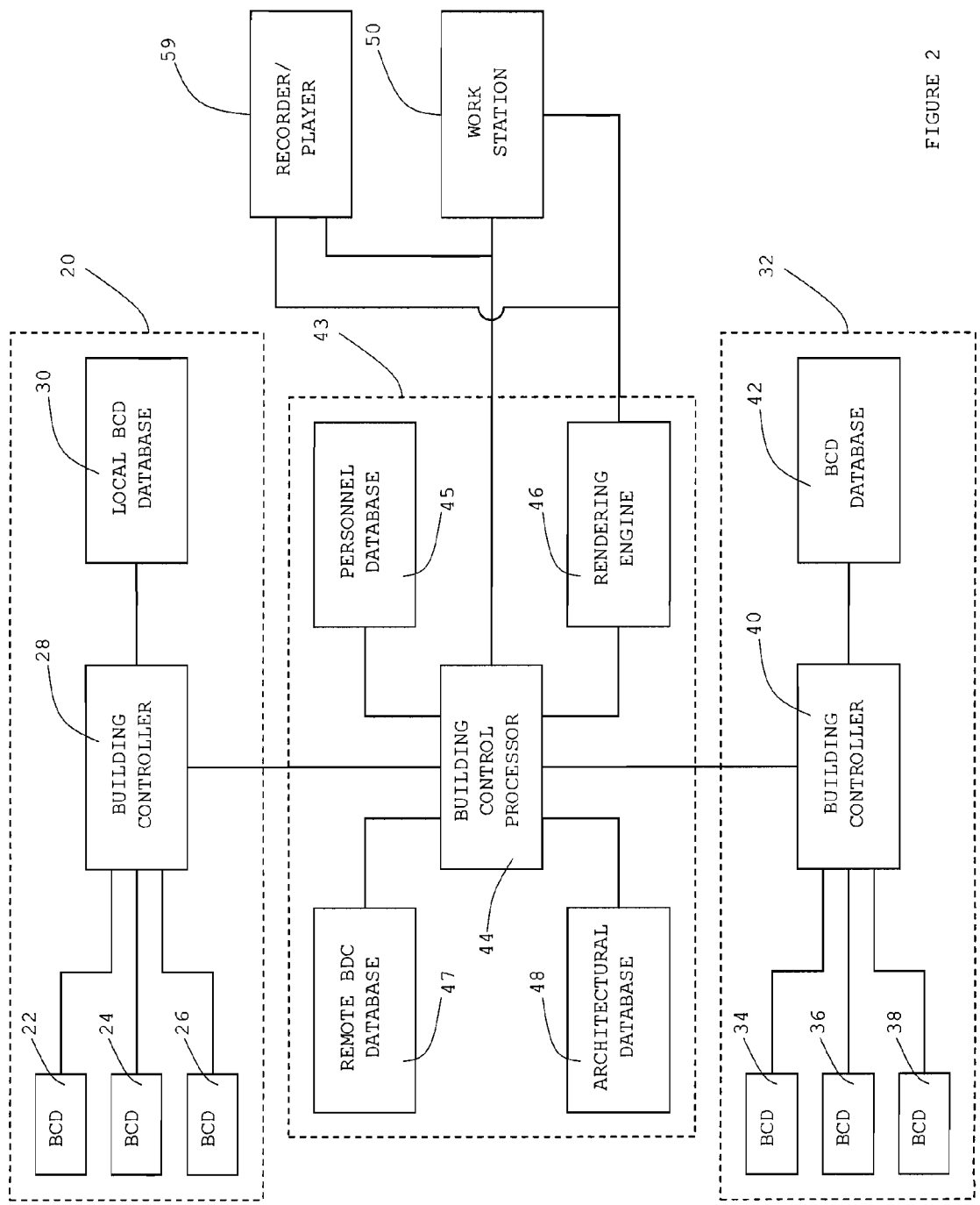
FIG. 2 reveals a system for managing the operation of one or more buildings.

FIG. 2 shows a system for managing the operation of one or more buildings. Building 20 may contain several BCDs 22, 24, 26. BCDs 22, 24, 26 may be connected to building controller 28. Building controller 28 may be connected to local BCD database 30. Each BCD may have a unique identifier for use by building controller 28 to identify communication. The BCD database 30 may contain information regarding each BCD within building 20 such as location and status. The BCD database 30 may be regularly updated by building controller 28. The BCD database 30 may reside within a hard drive or other memory. The BCD database 30 may be contained within building controller 28 or it may be external to building controller 28. The BCD database 30 may be updated either manually or automatically as BCDs in building 20 in that building 32 may contain several BCDs 34, 36, 38 connected to a building controller 40 and building controller 40 may be connected to a BCD database 42 are added or replaced.

A building 32 may be configured similarly as building 20. Building controllers 28 and 40 may be connected to a remote building management system 43 in a facility. A building control processor 44 may be the central processor. A rendering engine 46 may provide a three-dimensional (3-D) rendering to a remote workstation 50 having a two-dimensional (2-D) display device. A rendering engine 46 may be, for example, an Ogre3D, Genesis3D, Quake, or Half-Life engine. There may be alternatively a 3-D presentation on a 3-D display at the workstation 50. The terms "3-D" and "three-dimensional" may be used interchangeably as they have the same meaning. In a similar sense, the terms 2-D and two-dimensional may used interchangeably. A recorder/player 59 may be connected to the building control processor 44, rendering engine 46 and workstation 50 for recording activities, parameters, structures, changes, happenings, and so forth of the building management system.

A personnel database 45 may contain information about certain persons who regularly enter the buildings 20 and 32. Personnel database 45 may include general information about a person such as height, weight, and hair color. It may also include the RFID badge number assigned to that person. Further, the database 45 may include a picture of the person. There may be sensors about the building able to track and/or identify the person.

A remote BCD database 47 may contain the current status of all BCDs in both buildings 20 and 32. The remote BCD database 47 may be regularly refreshed by information from the local BCD database 30. The remote BCD database 47 may include the status of the BCD and a pictorial representation of it. An architectural database 48 may provide 3-D maps of buildings 20 and 32.

Figure 3:
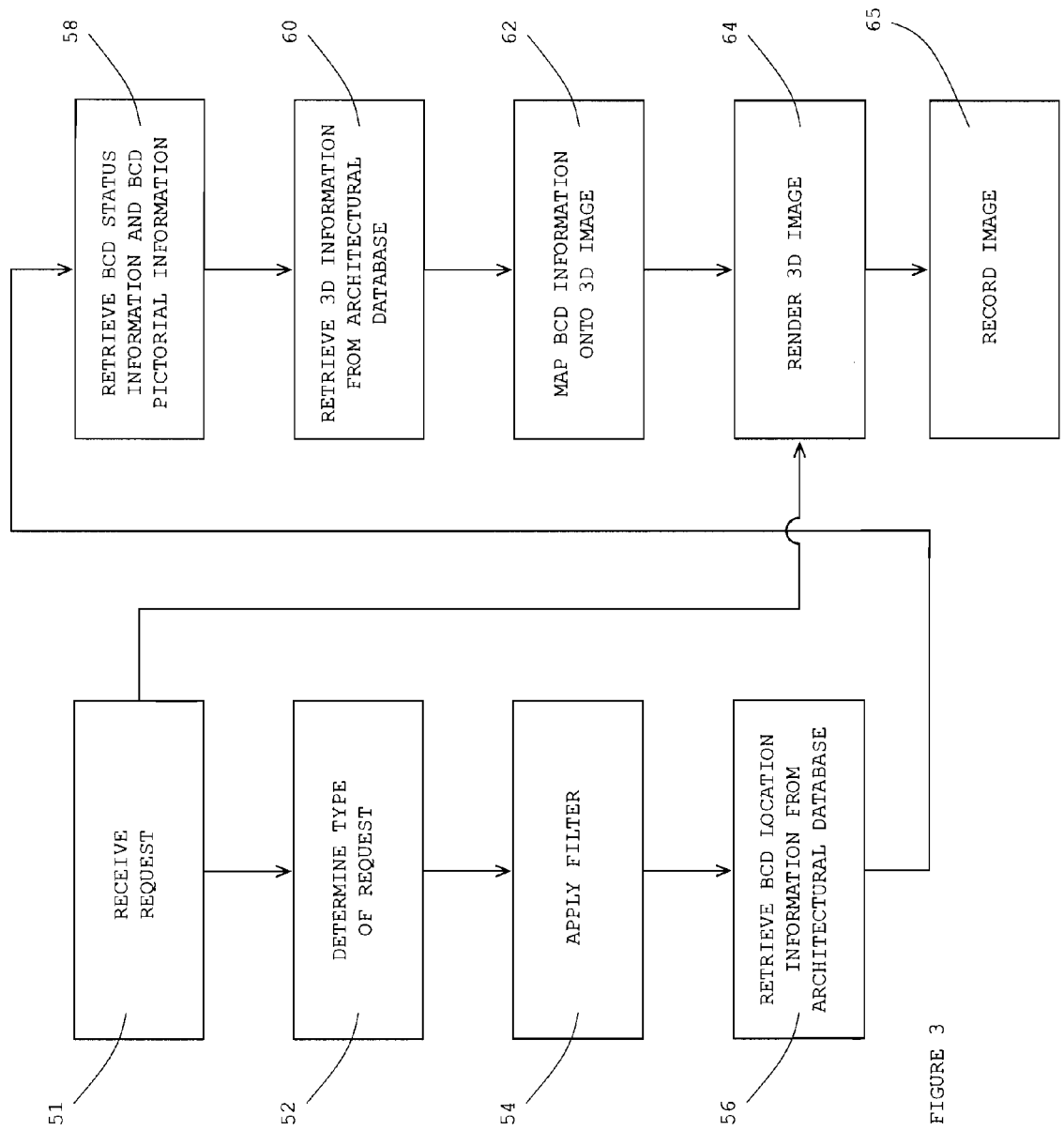
FIG. 3 is a flow diagram for operating a building management system.

The general operation of the system is shown in a flow diagram of FIG. 3. A request is received by the remote building management system 43. A step 51 may be a request for a specific location either within or exterior to the buildings 20 and 32 as well as a specific viewing angle.

The type of request may then be determined in step 52. The type of request may be for either a wire frame 3-D view where the building walls are transparent or a fully rendered view where walls are not transparent. Filters may then be applied in step 54. For example, a request may be for only thermostats or for all HVAC sensors or for all fire sensors. The BCDs which could be visible from a specific location may be retrieved from architectural database 48, as indicated in step 56. Obviously, if there were a transparent view of the building, more BCDs would be visible at a particular location than in a fully rendered view of the building.

BCD status information and BCD pictorial information may be retrieved from the remote BCD database 47 for the requested BCDs, as indicated by step 58. The appropriate 3-D image, or a 3-D rendered image on a 2-D display, for the each viewable BCD may be retrieved from architectural database 48, as noted by step 60. In step 62, a 3-D visual depiction of the status for the BCD may then be produced. The 3-D presentation of images may generally be regarded as a 3-D rendering in a 2-D display in the present description. However, the present system may accommodate actual 3-D presentations on a 3-D display. The 3-D effect of the presentations may be increased or decreased as desired or needed. The visual or video presentations may be in normal color or provided in other various colors for information conveying effects or other purposes.

A 3-D visual depiction of the status of a BCD may vary based upon the type of BCD. For example, if a BCD is a thermostat, a 3-D rendering of the thermostat may be provided along with a number indicative of the temperature read by the thermostat. If the BCD were a flame detector, and the status of the device was 'normal', then the flame detector may simply be colored "blue", while if the status of the device was 'out of normal', then the device may be displayed in red. Alternatively, a 3-D image of a flame may be rendered near the flame detector. If the BCD were a door sensor and the status of the BCD was that the door was "open", the appropriate door within a 3-D depiction may be displayed as open. The 3-D image for the particular location when viewed from the appropriate angle is then rendered, according to step 64. The 3-D may be recorded in step 65. All the devices within the remote building management system 43 may be a single computer performing multiple functions or it could be multiple computers.

Figure 4:
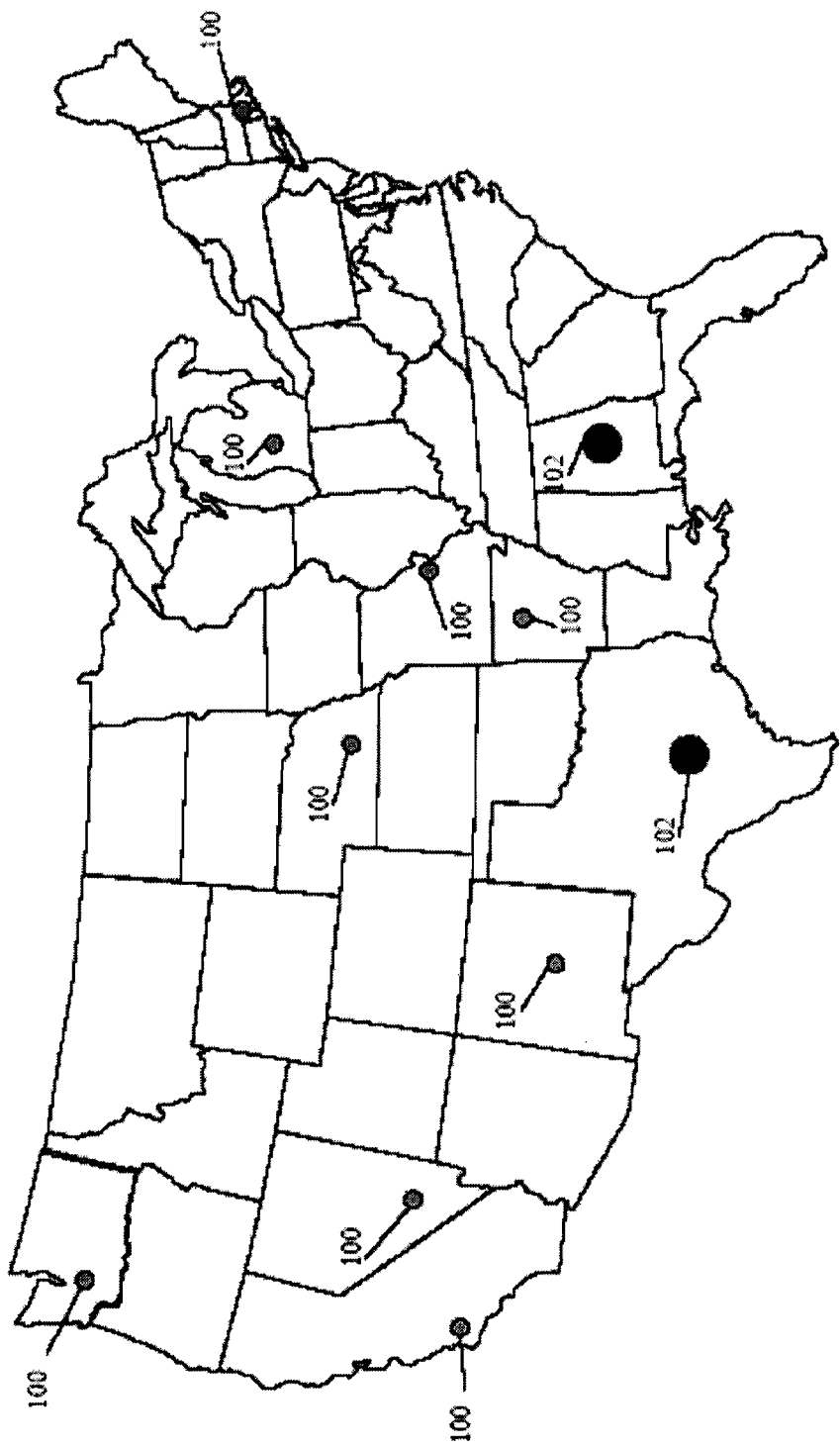
FIG. 4 shows a first level view of operating screen for the building management system.

FIG. 4 shows a first level display on work station 50. The first level display may show the various sites 100 and 102 connected to remote building management system 43 throughout a specific geographic region. Sites 100 and 102 may indicate individual buildings or campuses containing several buildings. Sites 102 are shown rendered as larger and shaded. These site features may indicate that one or more BCDs within a site are out of normal. By double clicking on any site 100 or 102 within the display, a second level view of the particular site may be produced.

FIG. 5 shows a campus level display. Site 102 may be displayed in more detail, showing buildings 120, 122, 124 and 126. Building 126 may be shown shaded indicating that one or more BCDs within the building are out of normal. Alternatively, building 126 may be displayed in a color, with a particular color indicating a particular status. For example, if a flame is detected within building 126, the building may be shown in red. If there is flooding detected in the building, then the building may be shown in blue. If a malfunction of a certain piece of equipment is detected in the building, the building may be shown in yellow; and so on. In this view, just BCDs out of the normal are shown. Thus, a BCD 128 is shown. BCD 128 may be shown shaded. BCD 128 may be any appropriate color. In this instance, BCD 128 is a thermostat, and the number "56" may be indicative of the current reading of the thermostat. The user may click on the mouse and be transported directly to the room with the out of normal BCD 128, move through the building 126 normally, or move through the building as a "ghost". At this point, the user may perform moves in a 3-D actual or 3-D rendered virtual reality throughout the building. A touch screen may be incorporated into display 200 and a stick-like object or finger may be used in lieu of a mouse pointer 204 on the display, particularly if there menus are utilized in the display.

FIG. 6 shows building 126 after the user has moved to the front of the building. Room 140, where BCD 128 is present, may be shown as illuminated due to BCD 128 being out of normal. A fire truck avatar or icon 142 may be shown next to building 126 to indicate that an emergent condition exists within the building, probably related to a fire. A user may interact with fire truck avatar 142 by approaching the avatar. A link may be provided between the user and the person or entity related to the avatar. For example, if the user approached the avatar, the user may be directly connected to fire control for building 128 by way of an audio, data, or visual link, or all three.

Different icons or avatars may be used to show the general status of the building. The building control processor 44 may determine the status of building 126 by reviewing the data from all of the BCDs within building 126 and by using artificial intelligence algorithms, assess the state of building 126. For example, if building control processor 44 determined that the problem was a faulty BCD, a repairman icon may be shown outside the building, thus enabling the user to contact a repairman. If the problem is an open door, then a security officer icon may be shown, allowing the user to immediately contact security. If there is flooding, then a plumber icon may appear on the display by building 126. If the power is out, then an electrician icon may appear; and so on.

Figure 7:
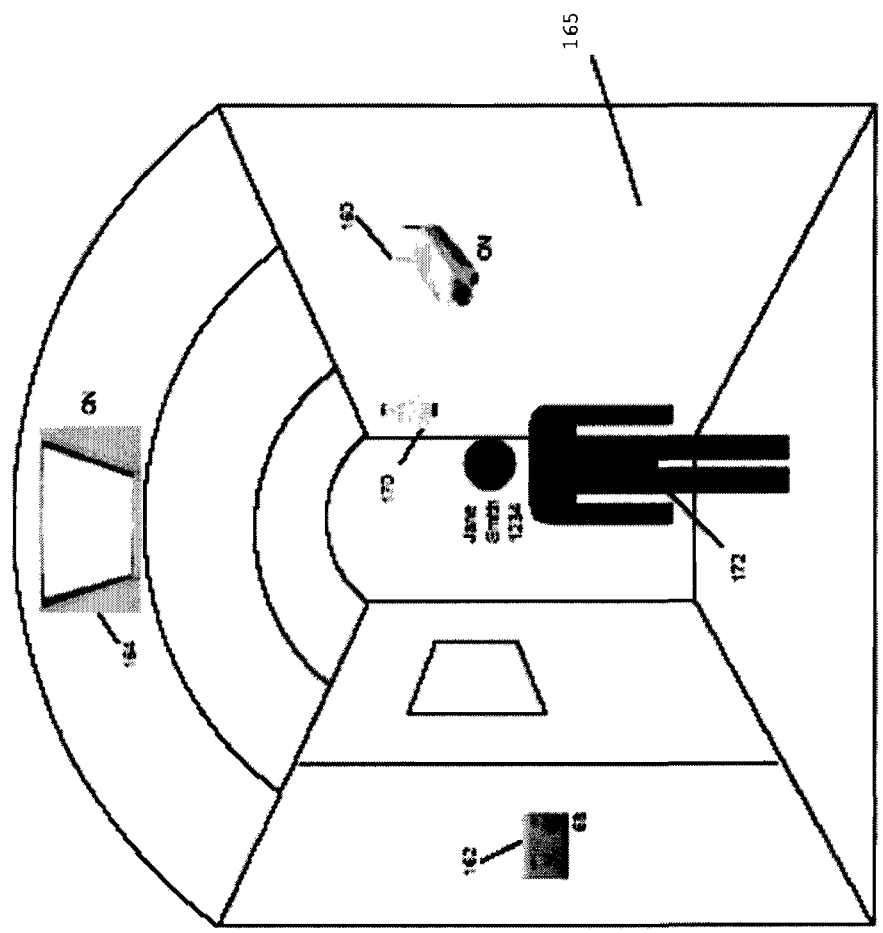
FIG. 7 shows a room view for the building management system.

FIG. 7 shows the display after the user has entered building 126. As stated previously, the wall dimensions and shapes may come from architectural database 48. The rendering of the view within the building may be performed by the rendering engine 46. The location of BCDs 160, 162 and 164 may come from either of the architectural database 48, the local BCD database 30, or the remote BCD database 47.

Video camera 160 may be a BCD. The status of video camera 160 may be shown next to video camera 160. The user may interact with the camera 160 by moving to the device and entering a key combination, "point and click" or any other way for indicating a desire to access the device. When accessed, the user may be allowed to turn the device on or off or to access further information about the device. In this instance, a user may be allowed to view the video from the camera 160. Controls associated with the BCD may be shown. For example, video camera 160 may be shown with rewind, fast forward, and play buttons, allowing the user to interactively view video collected by video camera 160. If video camera 160 were remotely moveable, a user could change the view of video camera 160. The video camera 160 may be virtual or actual.

Figure 8:
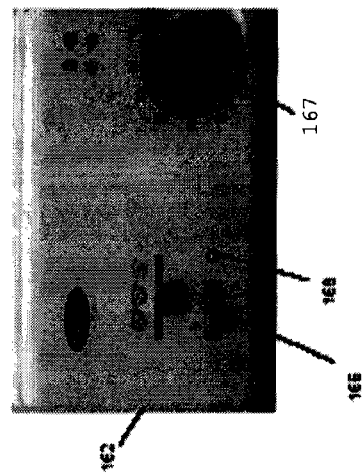
FIG. 8 shows a view of thermostat.

Thermostat 162 may have a status indicator of "68" proximate to the thermostat showing the current temperature detected by thermostat. If a user moves to the thermostat 162, thermostat may be shown in greater detail, as shown in FIG. 8. A user may manipulate various settings of thermostat 162 such as heat or cool on or off, by interacting with the image of the thermostat. For example, the user could virtually turn dial 167. If the user clicked on switch 166, the heating element controlled by thermostat 162 may be turned off, and an indicator 168 on thermostat 162 may change to accurately show its condition.

Light 164 may show a status of "on" proximate to the light. The light 164 may be turned on or off by the user by either finding the switch 166 for the light in the virtual building or by clicking on the light.

Wall 165 may be shown as a solid surface. However, the contents of the wall may also be shown. For example, ductwork, electrical conduit, water pipes, and sewer pipes may be selectively displayed. The user may walk through the building to any particular room and thus view the BCDs along the path to a particular room. Thus, a user may do a virtual inspection of the various BCDs within the building. This may be extremely advantageous for assessing a condition associated with a particular BCD. For example, if the BCD 128 indicates a temperature of 456 degrees, other thermostats near BCD 128 may also indicate increased temperatures. Thus, by moving through the building, the existence and probable location of a fire may be ascertained by viewing the various thermostats. By allowing the user to virtually move through the building viewing information from BCDs, the user may not only see the pure data from the BCD, but also the geometrical position of the BCD in relation to other BCDs as well as walls and other features of the building.

Returning to FIG. 7, if this particular building is equipped with RFID reader 170 and the RFID reader 170 is reading an RFID badge for a person, then an avatar or icon 172 for that person may be displayed as well as certain information regarding that person such as their name and badge number. If a picture of the person for that RFID badge is present within personnel database 45, then that picture may be mapped onto avatar 172 by the rendering engine 46.

A user may interact with the person represented by the avatar or icon 172 by clicking on the picture. The information in the personnel database related to the cellular telephone number may automatically be used to connect the user to the person represented by avatar 172. It would also be possible to remotely move camera 160 to view in real time the person represented by avatar 172.

Figure 9:
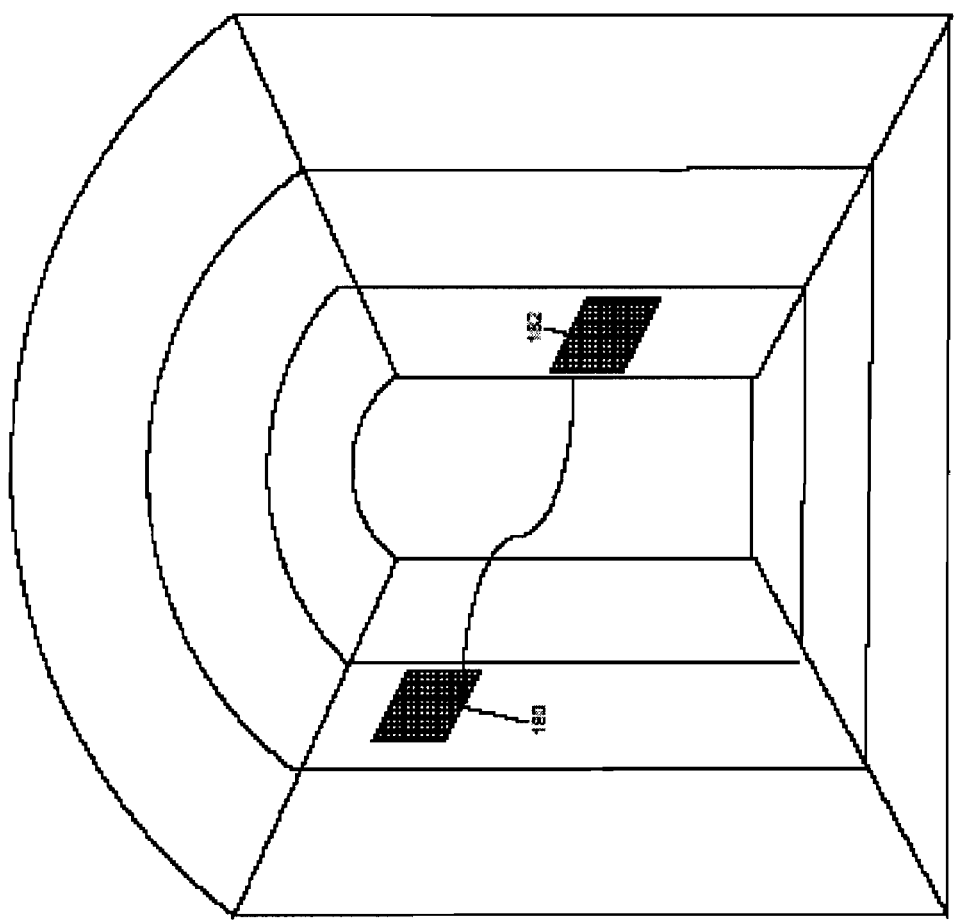
FIG. 9 shows a room view of the building management system showing air flow between two ventilation ducts.

While representation of visual objects is valuable, the system may further provide for a way to view certain physical features which are generally not viewable. FIG. 9 shows the same room as FIG. 7, with the addition of two air ducts 180 and 182. Air flow sensors within air ducts 180 and 182 may provide information regarding mass air flow. The building control processor may obtain the calculations from the two sensors, and then construct a 3-D model for air flow between the two sensors. A depiction of the air flow may be displayed to the user. A user thus may be able to "observe" the air flow within the building as he moves through the building. Various depictions of the air flow may be used, such as lines or dots. The lines, dashes, dots or other marks may also be colored to indicate air temperature or whether the movement of the air was out of norm. For example, the temperature in the room may be depicted by a color of the room. Colors in various forms and/or of entities may indicate values of different kinds of parameters.

There may be an approach for navigating quickly to a point of interest. Navigating or browsing in a visual model of a building control system representing a building may take time and thought on the part of an operator. The operator may need an efficient way to navigate to the next point of interest. For example, when the user walks into a virtual room, the controls and other potential points of interest may be inventoried and sorted in clockwise order from the center. For each control in the group, it would be possible to calculate a viewing position from which the display on the control could easily be read. For example, the vector from the control to the center of the room could be calculated, and the user could be positioned along that vector between the two points, facing the control. The head orientation could be calculated to directly face the control from that position as well. This would eliminate any distortion created by the viewing angle and make it possible to easily read the display of the control. This idea of fixed-point navigation could be extended so that the doors to the rooms were included. This would make navigation around the building much faster if the user wanted to quickly travel around the floors—a single key press could take them to the next point in a given direction. In fact, the concept could be taken still further so that the user could be positioned at locations hovering outside the building with viewpoints into each room and floor as fixed points that could be quickly navigated to. The walls of the building could be transparent or perhaps the upper floors and ceiling could be hidden, allowing a view into the rooms on the floor below the viewer. The idea of restricting the movement of the user in this navigation scheme doesn't take away from the freedom offered by the additional dimension, because the 3D perspective would still make it easy for the user to maintain an awareness of where he was in the building (the location and viewing angle would slide from one point to another to maintain the sense of movement within the 3 dimensions). In addition, it would be possible for the user to quickly switch between free and fixed-point navigation.

Navigating quickly to a point of interest may have an elegant mathematical basis. For instance, when an observer walks into a virtual room, there are a number (n) of points of interest (POI's) with x, y, and z positions which may be incorporated in an inventory. Each point of interest (POI) may be selected according to its position relative to a central point (RC) in the room. To list a POI in the inventory according to position, an angle between the room's central point (RC) and each POI may be calculated in the following.

One may note for n POI's: POI[1], POI[2], POI[3], ... POI[n] that $$\text{Angle}[1] = \arctan((POI[1].y - RC.y)/(POI[1].x - RC.x))$$

$$\text{Angle}[2] = \arctan((POI[2].y - RC.y)/(POI[2].x - RC.x))$$

$$\text{Angle}[3] = \arctan((POI[3].y - RC.y)/(POI[3].x - RC.x))$$

$$\vdots$$

$$\text{Angle}[n] = \arctan((POI[n].y - RC.y)/(POI[n].x - RC.x)).$$

The calculated angles may be translated to values between 0 and 360 degrees and sorted in an order, according to angle, name, or some other criterion. For example, one may sort the POI according to position in an order about or around the room relative to the central point. This information may be part of the model 205.

A location from which the observer may view a given point of interest (POI[m]) may be calculated. The following calculation may be used to determine a point that is along a vector from the RC to the POI and an arbitrary distance (AD) away from POI[m].

$$\text{Position}[m].x = POI[m].x - (AD) * \cos(\text{Angle}[m])$$

$$\text{Position}[m].y = POI[m].y - (AD) * \sin(\text{Angle}[m])$$

Given that a position of the observer's virtual head is at a height VH.z from the floor and that POI[m] is at a height POI[m].z from the floor, the viewing tilt (head tilt), from the observer's position[m] to POI[m] in order to face it directly may be calculated as, $$\text{Tilt} = \arctan((POI[m].z - VH.z)/AD).$$

Thus, the observer may look at each point of interest from the best perspective for ease of viewing.

The present system may be applicable to a 3-D rendered 2-D environment, a 2-D environment, and/or a 3-D environment. Upon navigating to a zone, collection of zones, or building, the system may automatically orient the view to the most appropriate point of interest, displaying the information most likely of interest to the operator. It may also highlight the area of the visual presentation containing the information of interest by changing the brightness of that area of the display, drawing a circle, or some other visual indication to draw the operator's attention. The operator may easily navigate to the next point of interest in that zone by selecting a direction on the display, or pressing a function key. The points may be organized and presented in order of priority. In a 3-D model, the orientation process may involve moving the point of view through the model, backing out for perspective, and zooming in for detail automatically. This may help the operator to reorient himself.

User interface software may be implemented to allow navigation only to interesting points within the building. The software may be designed so that one cannot navigate into a wall or into the earth beneath the building, unless there are provisions designed into the building control or management system for doing so, such as disassembling the wall for observation and investigation.

A backward looking information recorder, e.g., recorder/player, which records data from a building's sensors and actions taken on the building over various periods of time, and plays them back, may be incorporated in the building management system. Exploratory and navigational information may be recorded and played back at virtually at any time at a various speeds or in the form of still presentations. The recorder/player may help a facilities manager to efficiently trouble-shoot problems within a building, manage energy usage, and understand the relationship between the different systems within the building. Information including the model, navigation and related events, sensor and actuator information, videos, biometrics, readers and read information, parameters, and so on, may be recorded for playback and analyses in the present systems. The recordings may include 3-D models, 3-D rendered information, color, grayscale, and black and white video and graphics, sound, operator activity, navigational action and movements, observations, including activities associated with using and operating the present systems.

Also, the building management system may have some form of visual representation of the current state of the building, such as a graphical display with images representing the various components of the building. To begin, there may be simulation or a model of the building having a floor plan with icons, colors and text that represent the state of different zones, and equipment in actual 3-D or 3-D rendered in 2-D. These items may be recorded and played at other times for review and/or study. This model or simulation may present the changes in the building information over time, possibly as an animation. Building information may be updated with data from the building sensors, equipment, actuators, alarms, devices, including their locations, and the like, which may have input and output signals that are recorded and available for display, analyses, and so forth. Also, personnel and their location may be provided to the system. These noted items may also be recorded and playable at various times at different rates. Individual histories of activities, changes, and so on, of and for sensors, actuators, readers, cameras, detectors, displays, navigation, evaluations, individual buildings, associated structures and happenings, and so forth, may be recorded and be available for playback, analyses, and so on.

Viewing the last 24 hours, or another period of time, such as a year or more, of a building status may be attained by replaying the graphical display, video, including data that appear during that time, of the building within a shortened duration of time, such as a minute, for a quick synopsis of a status. Or the recorded information may be replayed at a more extended time e.g., a slower rate, for possibly rather detailed analyses. Also, historical data about the building activity and status may be available for review. For instance, replaying an animation in reverse may aid in fault analysis to see the events which preceded a given condition. By integrating HVAC temperature sensors and actuators, along with security equipment, identification devices, and motion sensors and actuators into the system, one may visualize the relationships not only between different areas of a building, but between the different systems as well. This information may be useful in understanding various phenomena of activities and operations occurring relative to the building, such as how the cooling turning on in the morning relates to people arriving in the building, and the effects of the temperature and energy demands over the course of the day. This information may be displayed in a 3-D format or 3-D rendering format. Also, this information may be applied to a 2-D model although the images provided to the display may be presented with a 3-D perspective, i.e., a 3-D rendering for a 2-D display or viewing. User interface software may be designed to take the operator into the 3-D environment. The noted items and information may be recorded and played back at another time. On a regular basis, there may be continual (e.g., 24/7) recording of activities and aspects of activities of the systems. Buttons of the recorder/player, like those on a VCR, may be used to navigate in time, in ordinary play forward and backward, and fast forward and reverse. There may be an adjustment for fast or slow play forward or backwards.

Figure 10:
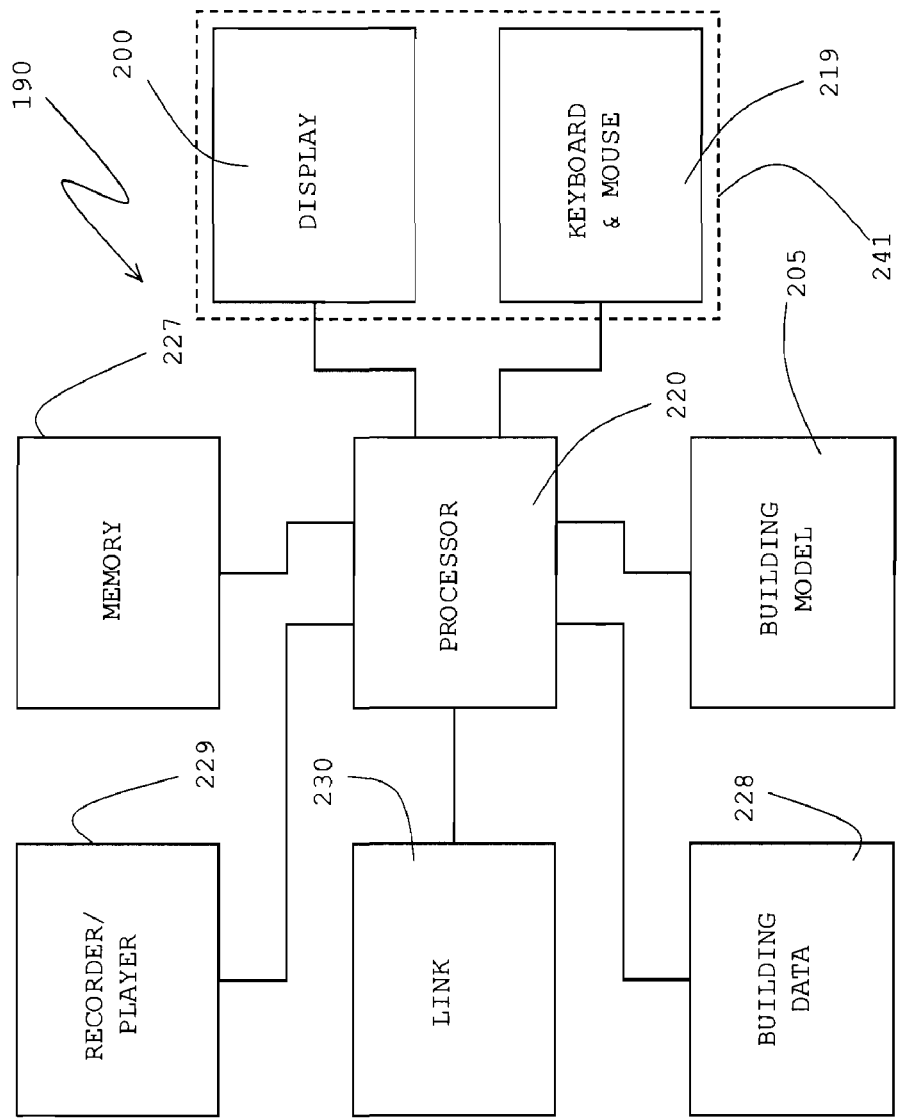
FIG. 10 is a block diagram of another building management system.

FIG. 10 shows a block diagram of a building management system 190 which may cover a number of buildings 240 around the world. A processor 220 may be the central portion of the system. The processor may be connected to the remote buildings 240 at locations 202 (FIG. 11) with a link or linking module 230. The processor 220 may be connected to a memory 227 for storage of information, software and programs, including those normally utilized for the effective functioning of the processor. A keyboard 219, including a mouse, as part of a user interface 241, may be connected to the processor 220 for effecting control of the building management system 190. A display 200, another part of the user interface 241, may be connected to the processor 220 for providing 3-D, 3-D rendered, or 2-D images to the user or operator of the system 190. An example of the display 200 may be an Actius RD3DU notebook having a 3-D screen which may makes possible for the operator to view realistic 3-D images without the need for special glasses. This notebook may be available from Sharp Corporation. Also, 3-D displays may be available from other sources.

A building simulation or model 205 module may be connected to the processor 220. The module may include a model 205 for each actual building 240 of the number of buildings. A building data module 228 may be connected to the processor for providing information about building 240 for complementing the model 205. The module 228 may receive data from the buildings 240 out in the world for updating their respective models 205. Additional models 205 of buildings 240 new to the system 190, including their GPS coordinates and/or zip codes, may be added. A recorder/player 229 may be connected to the processor 220 for recording building activity and playing back the activity at a later date at a desired speed. The recorder/player 229 may also record parameters, structures, changes, happenings, and so forth of the building management system.

There may be nearly instant navigation to a building model 205 in the system 190 by clicking on a globe or map 201 (FIG. 11) of the earth, or by using a menu (not shown), which may be shown in the display 200. One may zoom in at a location 202 of the building 240. The magnification of the image may be limited by the resolution of the satellite images available and a size of the hard drive in the memory 227. Speed of loading and viewing of very high resolution images should not be an issue since they may be split into separate files and be loaded generally only when necessary.

Figure 11:
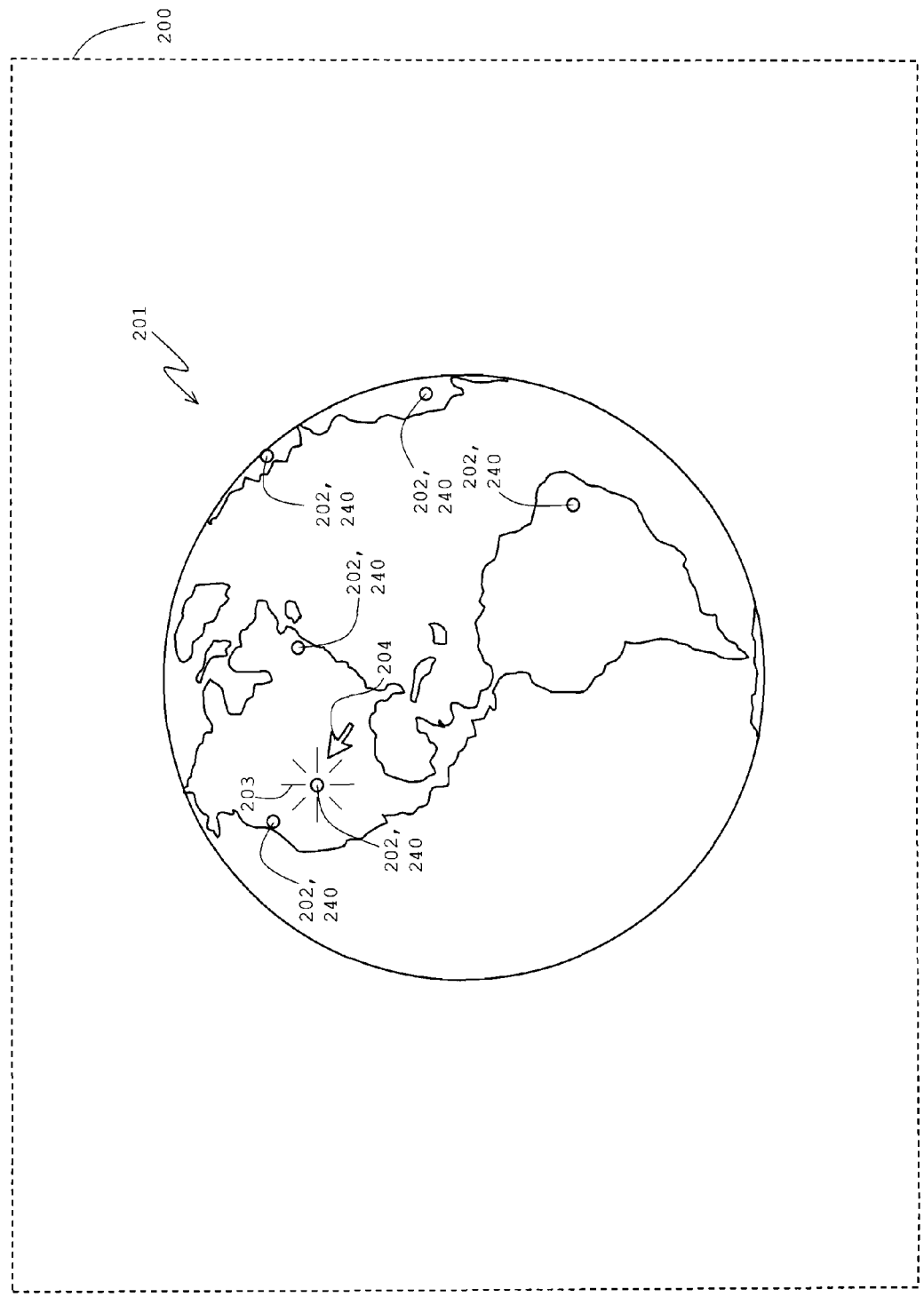
FIG. 11 is a map of the world as may be seen on a display of the building management system.

Alarms may be triggered in several buildings 240 at the same time which show up as warning lights centered on their respective locations on the map 201 as shown in the display 200 of FIG. 11. As each building's alarm condition is resolved, the respective warning light may disappear. The image of display 200 in FIGS. 11 and 12 may be a virtual or an actual image compiled from satellite data.

The source of the image on the display 200 may be regarded a virtual camera which is a compilation of digital bits for the model 205 module, the building data module 228, and other information that may be available. In certain instances, the camera may be an actual one for a compilation of data (to be stored in a database) for possible construction, updating or embellishment of virtual images such as those of models or simulations. The model or simulation 205 of a building 240 in the system 190 may be complemented to be highly detailed and better match the actual building architecture, permitting a person familiar with the site to instantly recognize the building 205 which may be the model of building 240, wherein he or she may be virtually located via the presentation on the display 200. Building 205 may be the virtual building or model, and building 240 may be the actual building. Textures may be used and shown in the model 205 for floors, ceilings and furniture. These may come from digital photographs from inside of the actual building 240. Images of landmark features (e.g., wall art, trophies, big etched partitions, and so forth) may be embedded directly into the model 205, thereby making navigation easy for the operator at the display 200 of the system 190, who may not be very familiar with the building 240. Items such as a refrigerator with a transparent door in the display 200 may show a temperature gradient represented by particles or other symbols with changes in speed and color. Data may be read from an external text file and changes can be seen in real time.

The model or building 205 may be that of a high-rise building 240 designed to demonstrate the latest concepts in virtual navigation of large buildings. Navigation may be based on a lattice concept, which includes stoppoints outside the building and within each room. This data may be driven, and new controls added to the model 205 may automatically be incorporated into the lattice. The viewer or operator's standing position viewing direction may be calculated based on a location of a control within the room. It may be possible to navigate to each control by either moving to the next one on the left or right, by typing the first letter of the control name, or by swiveling the viewing direction to observe other controls, and then clicking with a mouse on one of them. Hovering a mouse arrow or pointer 204 over a control may show specific values measured by the associated device.

Entrances between the rooms may be included in the lattice as well and be clicked on so as to almost immediately move from one room to another on a floor. From within any room, the user, viewer or operator may go up or down by a floor; thus, one may navigate the entire building while staying on the lattice and without going to one of the outside viewpoints. It may be quick, easy and not disorientating (due to a separation of navigation and positioning) to change from a room view to an overhead floor view. Management of furniture visibility and wall transparency may be automatic. The operator may back up to see the whole building to identify any alarms or warnings in any of the rooms. From there, in one illustrative example of an approach, the operator may click on any floor to go directly to the overhead view, and then click on any of the rooms on that floor to be taken into the respective room.

Many shortcuts for both the mouse and the keyboard 219 may be available for lattice navigation and each may be used exclusively. One shortcut may be demonstrated by quickly navigating to, for instance, seven rooms scattered throughout the high-rise building and resetting their temperatures in about one minute using the mouse, the keyboard 219, or a combination of the two. Personal transporters may be provided to enable immediate travel in a walking mode to any floor including the roof (which may be less useful in view of the lattice having stoppoints at each floor). The lattice may be boarded or unboarded at any location if the operator wants to virtually walk around in one of the rooms.

A microset may be located in each room of the building model 205 for displaying a setpoint and the current room temperature. The color of the ambient light in each room of the display 200 may be a way of indicating the ambient temperature in it. Outside the building, the temperature values may be represented using spheres, circles, or other shapes (e.g., note spheres or circles 206 and 207 in FIG. 13) centered on each room. The operator may have full control over the color and appearance of the spheres, circles or other symbols.

Clicking on a microset may automatically orient the viewer or operator so that both the microset and the panel showing its data can be seen. The data (e.g., an occupied status or setpoint temperature) may be read from a spreadsheet. The microset and the color of the light in the room may in response in real time to value changes. The spreadsheet data may also be updated in a 3-D rendered application by using panel controls to change the values.

In the case of an analysis of a problem, the present approach may allow playback from before the problem occurred and show how the room temperatures changed over, for example, the previous 24 hours. The approach may be useful for recognizing a source of cascading faults or for detecting a series of events pointing to an equipment failure. The recording and displaying recent history of events in the building, as represented by the model 205, may be applicable to a 3-D rendered application (or a 2-D or 3-D application), and also can tie in with that application because the events may be viewable generally from any perspective and over any time span. This viewing capability may greatly assist in pattern recognition. A more inconvenient approach might involve taking hourly or daily snapshots for a year and reviewing the entire year to look for seasonal resource usage patterns.

An alarm for an open fire door may be triggered on any floor using the spreadsheet. The alarm may easily be seen from the outside of the building because each open door may be lit with a flashing room light.

A trash can fire may be started to show the capability of system 190 to simulate complex entities like flames, smoke and sprinkler water. (Note a trash can 218 and sprinklers 234 in FIG. 17.) The system may also show how effectively the fire can be seen from any viewpoint outside of the building through semi-transparent walls.

An evacuation trial may be conducted with human models moving through the building simulation 205 and down its fire escape. Each of the human models may be highlighted with a bright colored dot to provide easy visibility of the models from and to their location. The movement of the human models may be tied to recorder/player 229 and the evacuation may be replayed at different speeds to help recognize areas of the building having inefficient escape routes or areas where the fire alarm is not well heard.

The sun's location and intensity may be represented on a basis of time and date in the recorder/player 229 using an algorithm (e.g., one from the U.S. Department of Energy). The sun may be represented by an image in the sky. The effect of the sun on the building may be shown by casting a bright light from that location. The recorder/player 229 may play continuously or in a loop to show how the light of the sun on the building changes over time. If the loop spans only a few days, the entire range may be shown. For longer time spans, a seasonal view may be shown by representing each day with one frame at about the same time each day.

Data for historical cloud cover may be obtained (e.g., from WeatherUnderground.com) in increments of an eighth for the last five or so years. This data may be read by the system 190 and the cloud thickness may be represented directly in the display 200 of the model 205. The effect of the cloud cover reducing the intensity of the sunlight on the building may be noted.

Cumulative sunlight may be shown for a timespan such as eighteen months. In this way, the relative amounts of sunlight that each wall receives over a season or an entire year may be noted and measured. The relative intensities may be seen on each wall and the actual percentages of them may be recorded as well. Historical data may also be taken in account.

Other features of the system 190 may include infrared views of people in the building, light switches, extremely high or high resolution satellite images (e.g., from Terraserver), cylinders constructed from digital images of the outside of the building or within a room, and so forth. There may be a panel having a toggle for overrides and alarms. Also, there may be a building designer user interface.

The building management system 190 may integrate HVAC, security surveillance devices 231 such as closed circuit television (CCTV), radio frequency identification (RFID) readers, and face recognition apparatuses, into a virtual world of a camera and display 200. Security surveillance devices 231 may be situated near the entrance door 232 of the building and in other places of the building. To complement the data of the virtual world, a link to video camera footage or a live video feed from the building may be available.

Figure 12:
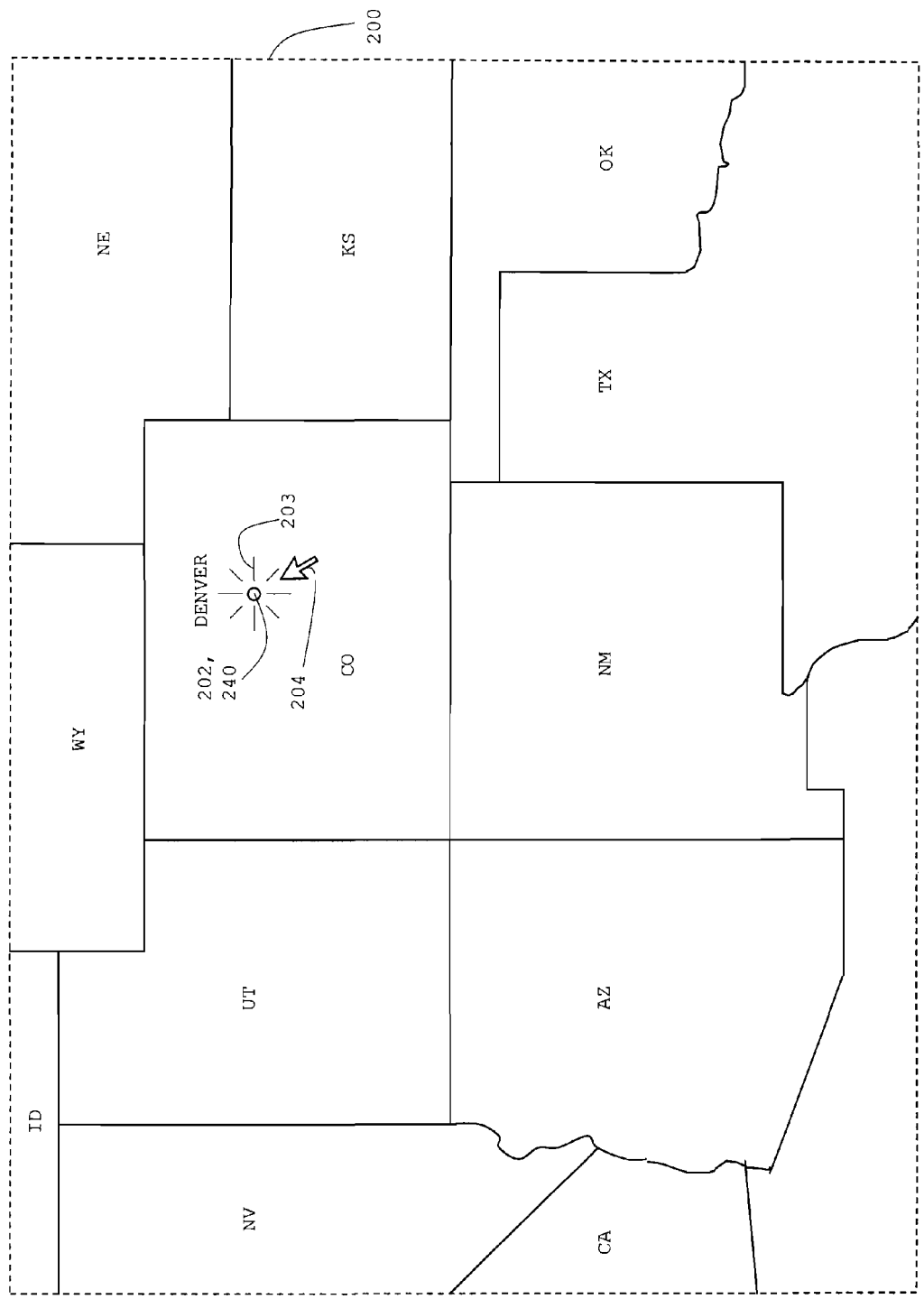
FIG. 12 is an illustrative instance of a regional map where a to be managed building may be located.
Figure 13:
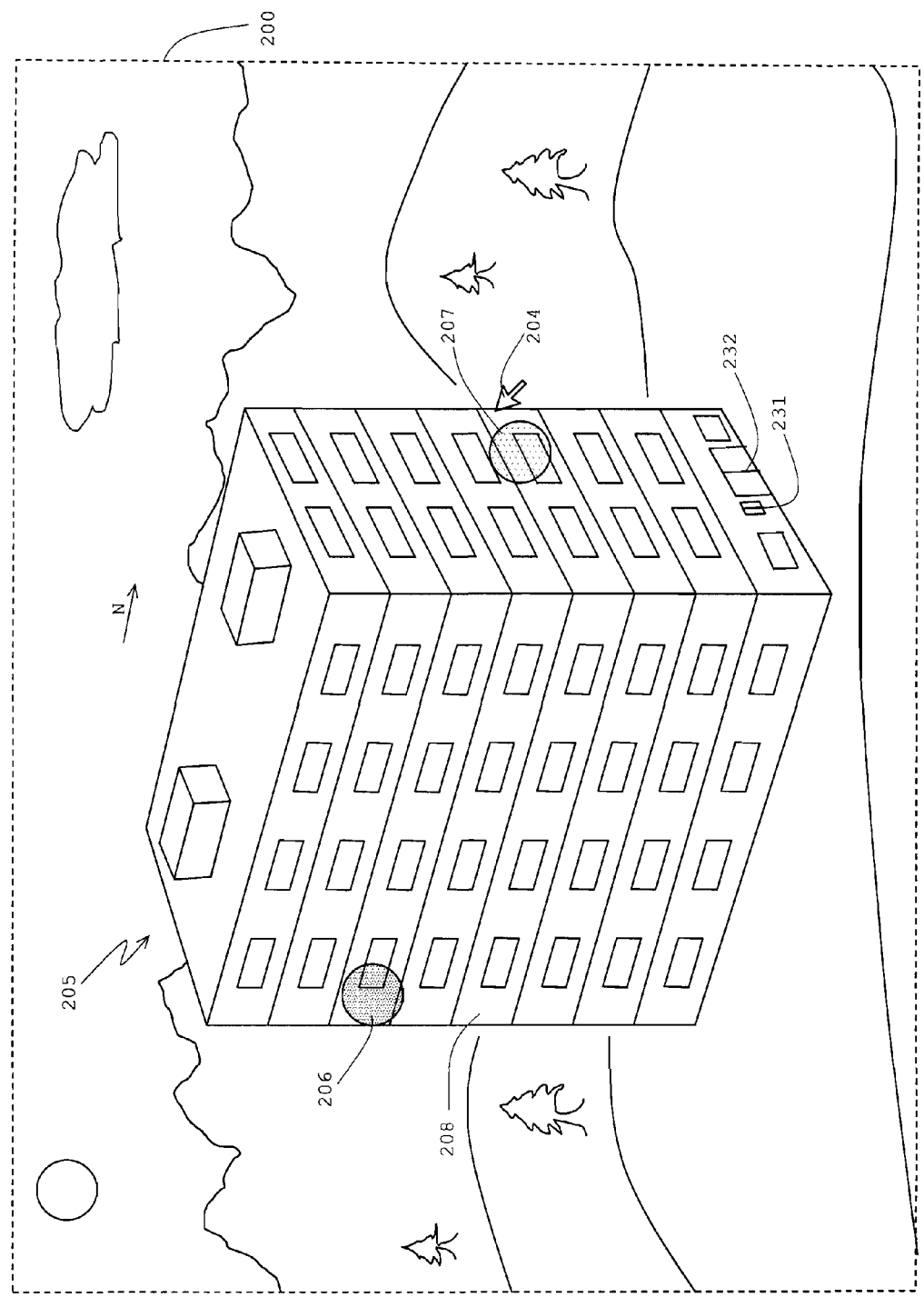
FIG. 13 shows a display revealing a model of a managed building.

The building management system 190 may include a monitoring station having the display 200 (indicated by dashed-line rectangle) with a rotatable 3-D perspective or 3-D rendered view of the earth 201 generated from satellite images, as shown in FIG. 11. One may have a group of buildings 240 located at various coordinates, locations or places 202 around the world, such as Seattle, Wash., Denver, Colo., New York, N.Y., Europe and Africa. For instance, if a building 240 has a problem, a flashing signal 203 may show up at a location 202 on the map 201 of the earth in display 200 of FIG. 11. By clicking with a pointer 204 of a mouse on the location 202 emanating a flashing signal 203, one may zoom in with a virtual camera on the image of the map 201 of the earth to obtain a regional map as shown in FIG. 12, which may turn out to be, for example, Denver, Colo., at a latitude of about 39 44.08 N and a longitude of about 104 59.36 W. One may again click the pointer of the mouse on the location 202 at Denver on the map in display 200 of FIG. 12 to further zoom in to see a building simulation or model 205 of the actual building 240 (or a hypothetical as an illustrative example) as shown in FIG. 13. Zooming in may be done to any magnification though limited to the resolution of the map and the simulation. The view in FIG. 13 may be a 3-D simulation or rendition, or model 205 of the building. In this instance, the building may be an eight-story high-rise.

The simulation or model 205 of the building 240 may be viewable at various angles in a 3-D perspective. The model building 205 may be viewed from any direction or angle. The building 205 may pulled apart in the virtual display 200 with a mouse and its corresponding pointer 204. One may look at any of the floors of the eight stories of building 205 by clicking the pointer 204 on the respective floor. The top floors and the ceiling may be removed from the display 200 for a view of the floor of interest from an upper perspective. If the floor is viewed from a lower perspective, the ceiling and associated components may be present in the display 200. Each floor may be selected and viewed from any angle and position as indicated by the view adjustment arrows 211, 212, 213, 214, 215 and 216. Clicking on one of the arrows with the mouse pointer 204 may cause the view to change, shift or move in a direction of the respective arrow.

Colors or patterns may indicate hot and cold areas, as indicated by spheres or circles 206 and 207, or other symbols, on the sixth and fourth floors, as examples respectively, as in FIG. 13. The circles, spheres and/or other patterns may indicate temperatures or temperature gradients in building 205. A too hot or cold room or area, as indicated by symbols 206 and 207, may be viewed by clicking pointer 204 on the respective symbol, room or area.

Figure 14:
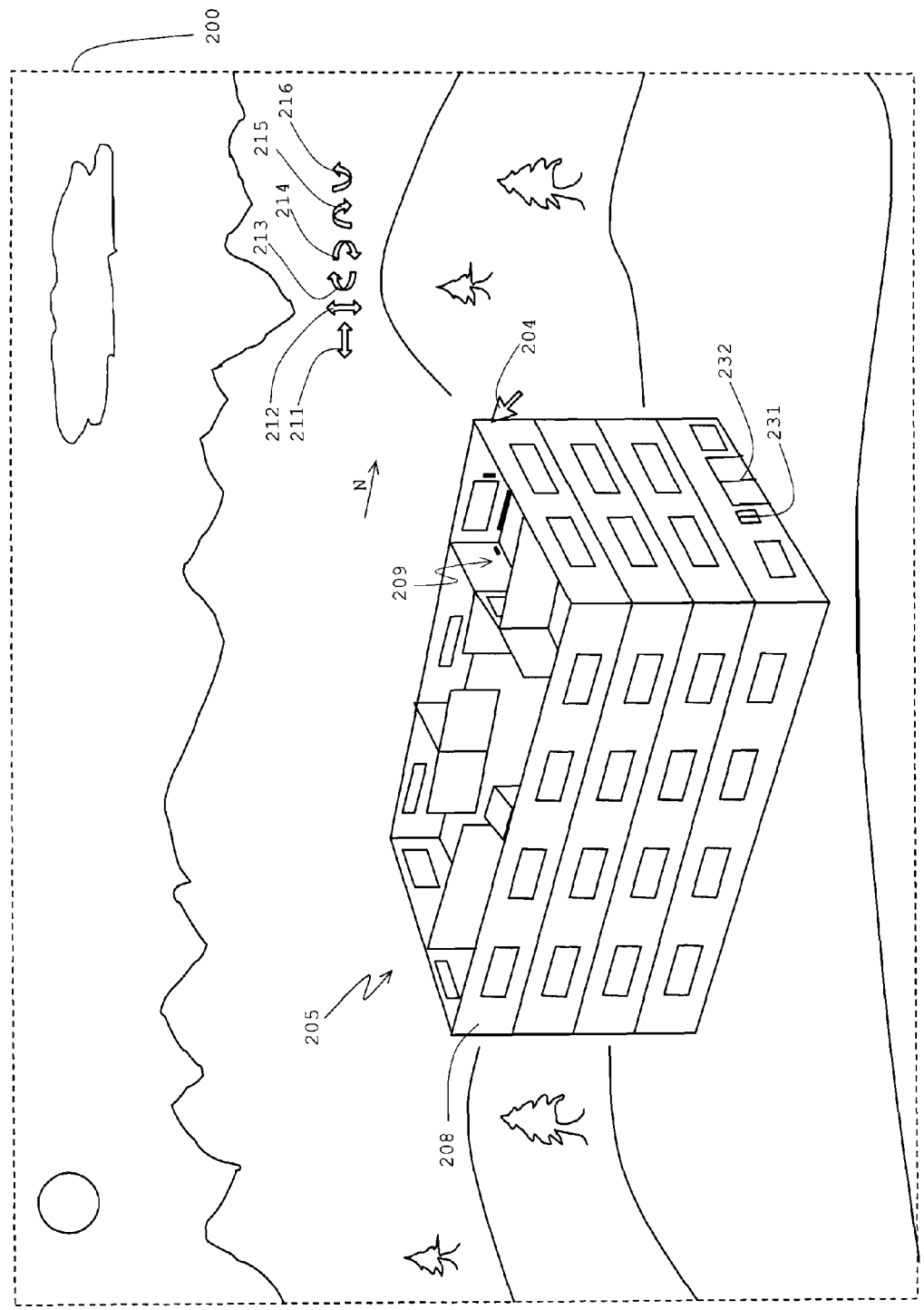
FIG. 14 shows in the display a virtual building model with some of the top floors removed.
Figure 15:
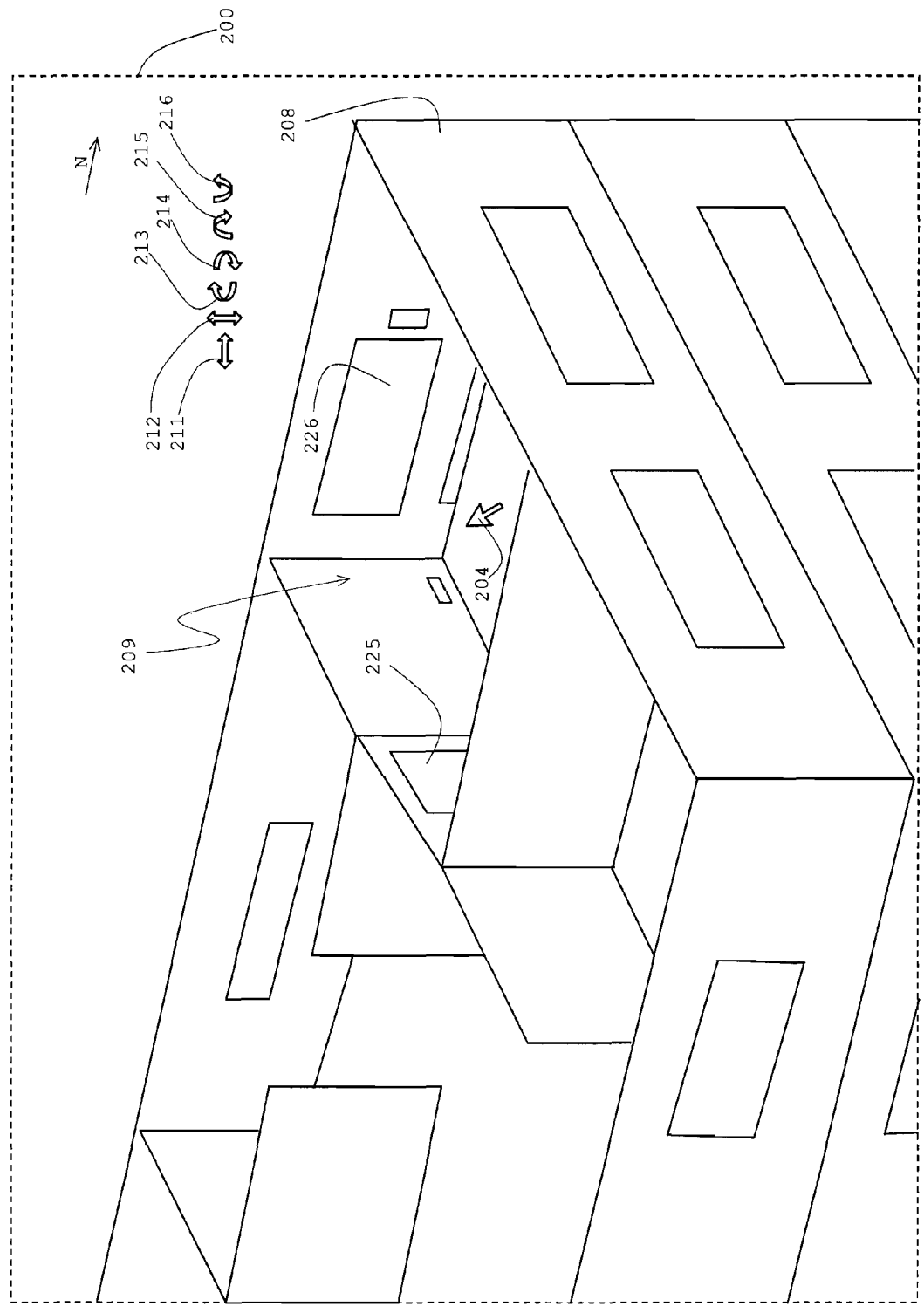
FIG. 15 shows the display with a zooming in of some of the spaces of a floor with the floors above them being removed.
Figure 16:
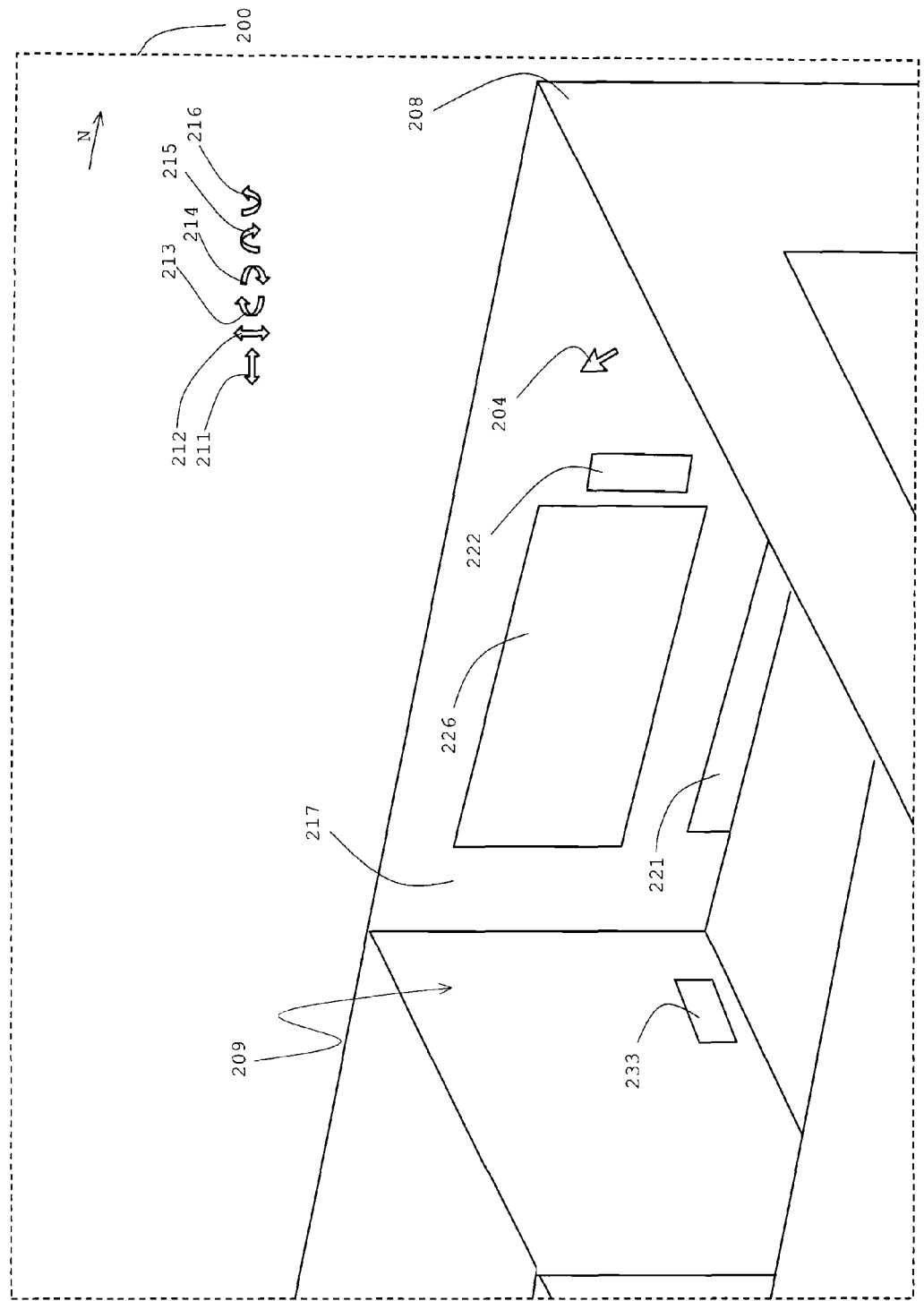
FIG. 16 shows the display with a further zooming in of a particular room of the floor.
Figure 17:
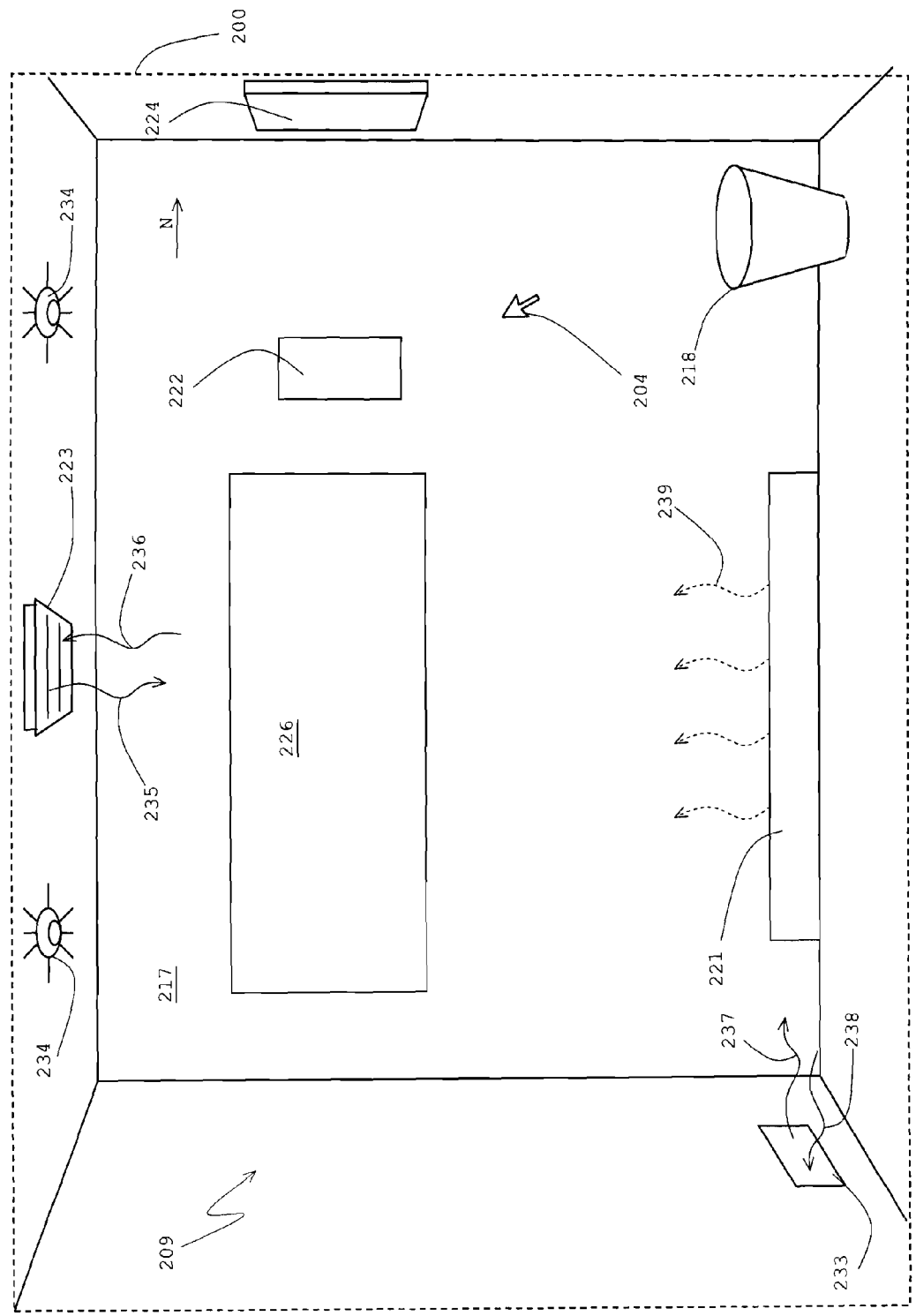
FIG. 17 shows the display with an inside view of the subject room.

One may zoom in on the individual floors by clicking the pointer 204, such as on a portion of a fourth floor 208, shown in FIG. 14. Each of floors may be observed from the top as with the upper floor or floors and/or roof removed from building 205 in the display 200. Each floor may be observed from numerous angles. Even a particular room 209 may be zoomed in with a click of pointer 204 on the room as shown in FIG. 15. Also, an area of the room 209 may be zoomed in on by clicking the pointer 204 on that area as shown in FIG. 16. A wall 217 of room 209 may be clicked on to result in a view of room 209 looking towards the wall, as shown in FIG. 17. This view of room 209 reveals a heater 221 or cooler 221, a thermostat or microset 222, a ceiling vent 223, a wall vent 233, sprinklers 234, and various sensors 224. There may be a trash can 218, furniture, fixture and other items in room 209 and in other rooms of the building. (Furniture, fixtures and other items might not be shown in some of the Figures, although FIG. 18 may be an example showing such items.) Room 209 may be closed off from the other spaces on the fourth floor 208, as indicated by a door 225 and walls as shown in FIG. 15. This door may be opened or closed and that status may be conveyed to the displayed model 205. Room 209 may have a thermally insulating window 226. Various sensors 224 may include a video camera, microphone, human presence sensor, face recognition device, RFDI reader, radiation sensor, smoke sensor, flame detector, light sensor, and/or the like.

Vents 223 may provide air 235 to room 209 or be an exit for air 236 from room 209. Vent 233 may provide air 237 to room 209 or remove air 238 from room 209. The air 235, 236, 237 and 238 may be of any temperature. Air 237 and 238 may be fresh air, heated air or cooled air. Similar vents for like purposes may be present in other rooms and spaces of the building 240 and correspondingly model building 205. Item 221 may be for providing heated or cooled air 239.

The thermostat 222 setting may be checked and the temperature of the viewed space 209 read. The temperature within the various spaces or areas of the building may be indicated by symbol 206 or 207, as noted above, a pattern or color in the space or area, such as blue for cold or red for hot. Other colors and patterns may be implemented.

The building management system 190 may be connected to all of the sensors (including the thermostats) so as to provide information about the building in the display or be available to an operator viewing the display 200. The system 190 may look at the heater or cooler 221, or air vent 223 or 233, for example, of the concerned space 209, by clicking the pointer 204 on the heater or air vent, respectively. The air flow and temperature, for instance, may be measured at the location of the heater or cooler 221, or vent 223 or 233, the thermostat 222, or other sensors 224, or any other place in the room 209, by clicking pointer 204 in the respective place. In the respective place may be a microset (besides 222) for indicating local parameters, such as temperature and airflow, to model 205. This capability is available for the other rooms, areas, places and space on the fourth and other floors.

These areas, conditions, and respective parameters may be recorded over time and be available for replay and review. One may navigate the building 205, hallways, rooms, and other areas. The computer or processor 220 operation, as directed by a viewer or operator, may move the virtual camera about the space in the building 205 via the keyboard 219 with the associated mouse in conjunction with display 200. The building 205 and its spaces may be virtually explored. The sensors may be located about the actual building 240 to provide parameter information to the simulated model 205. For instance, if one clicks a mouse pointer on a vent like vent 223 or 233, one may obtain a measure of the airflow through the vent and its temperature. One may check and operate the valves or other control mechanisms associated with heaters, coolers and vents, and other items, via actuators, which may be shown in the model building 205. The actuators may be used to turn on or off valves in gas or water lines or pipes, light a boiler, control electrical apparatuses, open and close doors, turn on or off sprinklers, switch lighting, open or close vents, effect locks, and so forth. The parameters from the various sensors and actuators may be recorded over time. Operator induced activity, such as those via the actuators, may also be recorded over time. So one may back up and review the events as indicated by the sensors, for example, a day before an incident of interest that occurred in the building 205 for analysis to determine the course of the incident and its cause such as a heating failure. Observer location of a virtual view relative to other objects in a space of the building 205 may be reviewed. One may simulate, for example, valves or controls in place of the suspected troublesome valve, or control in virtual reality to determine if such replacement solves a problem. With a simulation of various items, one may analyze the problem, and seek a solution. A detected difference between the simulation and the suspected item may be a lead to finding the troublesome item behind the problem. One may pull apart the floors, rooms and areas of the building 205 in the virtual display to obtain parameter readings which help pinpoint the basis of the potential problem. One may inspect the plumbing, wiring, ventilation, valves, switches, and so forth, in the walls, floors and ceilings. The walls and ceilings may be semi-transparent or disassembled during the inspecting. One may observe such things as boilers, rooftop air handlers, generators, and measure parameters associated with this equipment. The simulation or model 205 of the building may be designed to be as extensive or abbreviated as desired.

One may check the thermostat settings and actual temperatures in the various areas. Flow in and out of a relevant vent may be checked with flow and temperature indications with the mouse its corresponding pointer 204 placed in the area of interest in the virtual display 200. One remedy for a malfunctioning heater, cooler, or the like may include pressing a reset button associated with the particular piece of equipment. The resetting may be achievable with the display 200 and the mouse. The parameter readings may be stored for review. A replay of previous hours of readings and occurrences not only may indicate parameter measurements, but also the building conditions in virtual reality on the display at those times, which may be parsed for analysis. Also, sounds associated with the virtual display may be heard and recorded. Temperatures of the various walls may be read and recorded over time. This information about the building may be replayed of times and days of previous weeks, months and even years.

One may consider effects of the sun on the various outside walls and temperatures of the building model 205. The time, angle and position of the sun may be sensed, recorded and programmed into the system for each day. During a replay of this information, one may look back at a previous winter day of certain conditions in anticipation of an upcoming winter day to note the effects of the sun or the building having similar conditions. Also, the effects of the clouds may be noted and recorded along with the times of these phenomena. The time line of the virtual building image or model 205 may be moved time-wise backwards or forward during observation of various moments of interest. Model 205 may be used for mapping and incorporating actual observations of the building. The observations may be used to modify the existing model 205 to better simulate the actual building, especially for specifically desired applications.

There may be measured phenomena or parameter readings from spaces in the building 205 which may be characterized as a trash can fire, broken water line, failed heater or cooler, electrical power, inoperative vent, and so forth. For an illustrative example, if there is a sudden rise of temperature in a room on a certain floor, a reading of temperature sensors, smoke detectors and respective alarms, an operation of sprinkler system in eliminating the heat source, then there may an indication of a trash can fire and its extinguishment. One may replay the recorded parameters, sensed conditions and events to view a simulated fire, such as one in a trash can 218 in room 209 in a 3-D perspective as inferred by the building management system computer from information recorded during that event of the fire.

A use of 3-D views, or 3-D perspectives or renditions of views in 2-D presentations, and/or 2D views, plane and/or perspective, with replays of detected events may provide much flexibility in diagnoses of problems related to the events. This information may also be helpful in the prediction or anticipation of problems or events. The data and virtual images of the building, and inferred happenings in the building may provide a manager of the building an opportunity to reorganize patterns which show inefficiencies suggesting unnecessary resource consumption. The data and images of the past and present of the observed building may allow a drawing of inferences of potential equipment failures which may provide opportunities to take preventive measures before the times that such failures are likely to occur. Also, building parameter information, virtual images, and resulting inferences may provide the building manager with the capability to identify steps to take to achieve, for instance, an effective energy consumption strategy for the building.

The building management system 190 and corresponding model 205, including other systems and models in the present description may have application to various kinds of buildings, such as an office building, a health care center, a school, a factory, a prison, a hospital, and/or other kind of facility.

In a facility using the present building management system parameters such as work related to a work force and its output may be sensed, tracked, recorded and analyzed. For instance, relative to work analysis resource availability, response time for a given responder or area, and resource utilization may be determined. There may be capacity leveling based on 3D location of resources in the building or buildings. Data may be attained from sensors and records to route tracking and perform efficiency planning. There may automatic job costing of employees in a facility of facilities. It may involve costing a nurse per patient, including such things as to how much time a nurse spends walking versus being with a patient.

A facility or facilities, such as a factory, hospital, or the like, may incorporate asset tracking of, for instance, capital and non-capital equipment. Examples, say for a hospital may include wheel chairs, safety equipment, thermometers, and so on. Data about equipment, its status, whereabouts, value, and the like, may be entered into the building management system via manual entry through a terminal or via RFID or other automated readers.

There may be identified locations of people traced to work emergency medical services, fires, and security equipment. There may be tracking and dispatching by the management system of key personnel such as security guards, doctors, and other persons. If the building is a school, parents could identify a student's location or administrative personnel could identify where specific people are in the buildings. Also, congregating groups of people, such as students, could be located and even identified.

The building 205 or facility have $CO_2$ sensors and other indoor quality air sensors which may provide information to the building management system 190 display 200 (such as the 3D version). Also $CO_2$ sensors may be indicated occupancy.

There may be asset tracking such as that of audio visual (AV) carts. The status of various doors in the building may be indicated, such as whether they are open or closed, or locked or not. This status indication and control of doors may be useful in, for example, lockdown situations. Occupancy of secured areas may be determined, for instance, a caged area in a machine shop of a school, confirming that a teacher is present. Also, indications of occupancy may be useful for controlling HVAC systems.

In the situation where the building 205 is a manufacturing or production facility, the building management system 190 may provide ERP information. The system via the display 200 may enable the user to watch a product move through a model of manufacturing floor of the model building 205. Inventory, shipping and receiving status of materials, supplies, and products may be determined and tracked by the system 190 and such information may be provided on the display 200.

Associated with the product related information, including the movement in and out of materials, supplies and products, may be entered into or recorded by a backwards looking information recorder (BLIR). Past product-related information may be reviewed on display 200. The product related items may be tracked with RFID, cameras, E-filed detection, and other tracking technologies. Temperatures detected by the system 190 may be used to track, for instance, large items.

Data sources, various information systems, and other resources may be integrated into the model building 205. Such integrated resources may include, for instance, HVAC building control information, access control systems, security systems, lighting systems, internal communications within the buildings and with other buildings around the world. The integration techniques may include, but not be limited to, web services, native library interfaces, importing/exporting files, and various other IT interfaces.

The actual building and its corresponding model 205 in display 200 and system 190 may incorporate appropriate sensors, indicators and actuators for emergency situations. Such items may show smoke and fire status, smoke flow and progression during a fire, tracking of people during a fire, indications of the best routes for people to exit the building, and indications the best route for rescuers to a particular location in the building.

If the building and its model 205 have a hospital environment, the system 190 with its display 200 and appropriate sensors, then information displayed may include the number of people in a room, status of a patient including an indication of various biometrics, video feed for a patient, advisory information about a patient such as medication warnings, prescription information, contagious alerts, and the like.

Contagion of disease or other kind of harm may be contained with various sensors and actuators among the rooms in, for instance, a hospital environment in the building and may be represented in its model 205 on the 3-D display 200. Room pressures having indications of plus and minus, relative to other rooms and/or spaces may indicate the direction of the flow of air possibly carrying germs of contagious diseases. Also, the amount of pressure differentials among the rooms and/or spaces may be measured and shown in the model building 205 on display 200 of the building management system. Other items related to contagion and its control may include indications of room servicing information, route tracking of a nurse or other personnel during a day (in BLIR), and a plot in BLIR of anyone who had direct interaction with and individual or a zone within the hospital or care facility as revealed by model 205 on display 200. The may be provided on a PDA display to nurses information relative to patients and their rooms. The system 190 may aid in assuring HIPPA compliance for privacy of information. There may be robots for delivering medication. Such robots may be tracked. Medication taken into a care space may be identified. For example, there may be tracking and an alarm for when penicillin is brought into a room of a patient who is allergic to the penicillin. This tracking and alarm may apply also to other allergies (e.g., certain foods). Such tracking and related information may be effected by the building management system 190 and shown on the display 200 as part of the model 205.

The hospital environment of the building and its model 205 of system 190 may also locate doctors, track security guards, and let supervisors monitor the locations of nurses, especially for nurse calls.

Figure 18:
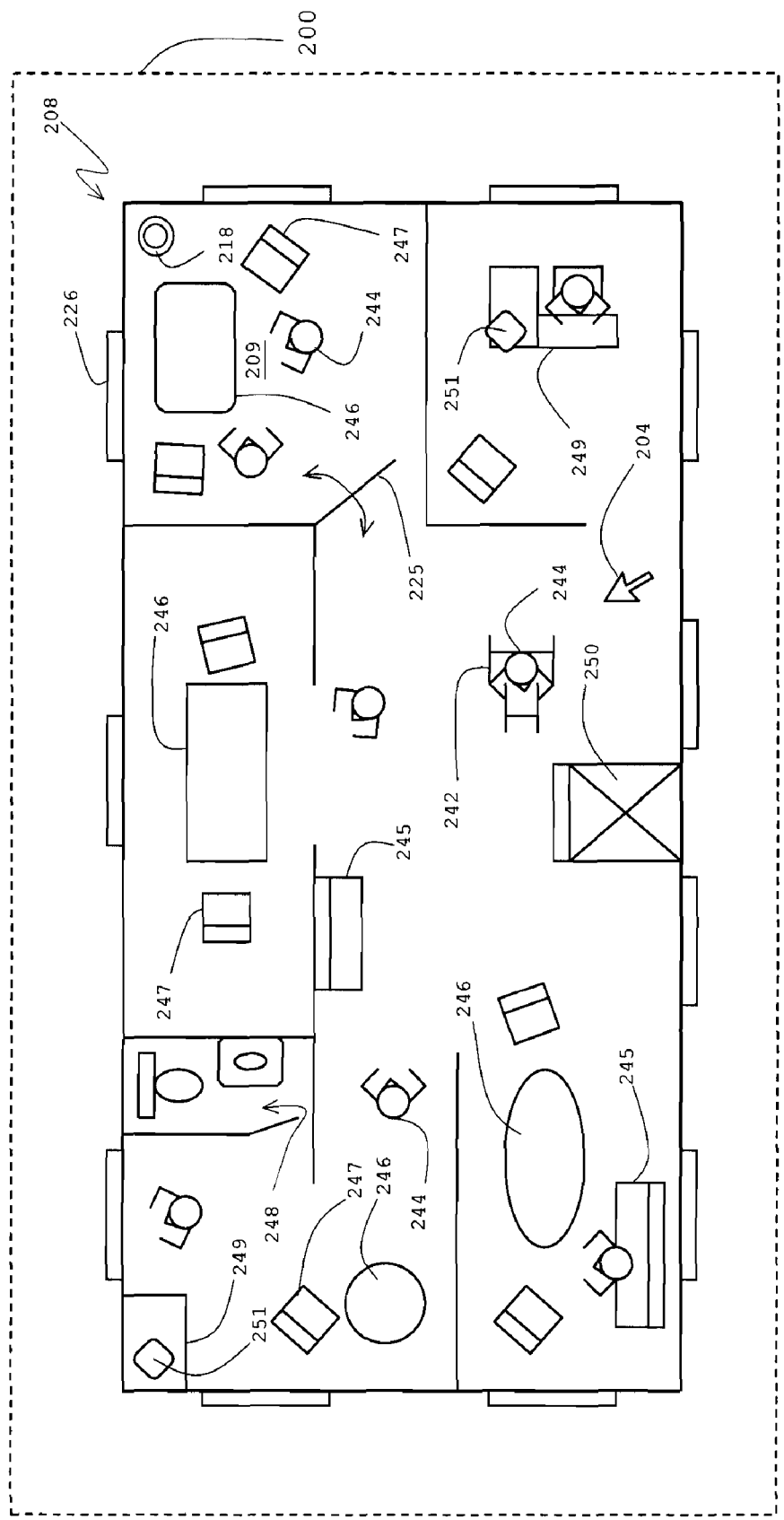
FIG. 18 shows a plan view of a floor revealing an instance of some people, furniture and fixtures.

The system 190 building model 205 and display 200 may use 3-D and/or 2-D maps of floors with people 244, including some in a wheelchair 242, moving through a building, such as shown in FIG. 18. These maps on display 200, in conjunction with system 190 and its model 205, may be used to optimize a floor plan layout for efficient movement, determining appropriate locations for notices and warnings, and so on. The maps may also be used for optimal placing advertising or promotional displays in the case where the building is a store.

The maps of the system 190 may be used for optimizing fire evacuation routes, identifying where people are during an emergency, and tracking exit routes during an emergency.

The building management system 190 may have various modes and operations. It may filter staff versus non-staff personnel. It may contain pictures of individuals which are mapped on them in the system. The system 190 may also contain pictures of various assets in the building mapped on to the model 205 of the system. Examples of such assets may include couches 245, tables 246, chairs 247, bathroom fixtures 248, desks 249 and computers 251. An elevator 250 may be an identifiable feature that helps a viewer with facility recognition.

Again, the BLIR may be applied to any of the various portions of information within the system to provide a visualization over a time period of changes monitored and recorded. Such information may cover environmental data including weather, properties of the sun, seasonal and daily variations, cumulative effects of certain weather conditions, outdoor and indoor quality with data on $CO_2$, pollutants and the like. BLIR as a way of viewing a simulation of a recorded sequence of events is not only applicable to a 3D display, but it is especially applicable to the display since the amount of information that can be provided in such as a simulation as well as the number of interactions between various components of the system make it more likely that patterns will be detected with the additional perspective that a 3D display provides.

The BLIR may, as required, provide exports of information in various formats (e.g., VRML, movie formats, and so forth) to various entities outside the system 190. The BLIR may record for playback persons or assets followed under an automated tracking mode.

A corporate dashboard may be used to represent data. Such dashboard may be shown on display 200.

As noted herein, the 3-D model 205 of system 190, may provide in the display 200 the general building status including lighting, $CO_2$, current temperatures, supply air temperature, humidity, solar load, and net energy including the total energy consumption according to space.

RF availability and usage may be determined by the system 190 in terms of representing the relative signal strength by location or zone of various RF signals. Such determination may be used for diagnostic support and capacity planning by IT personnel.

The building management system 190 may be integrated with other viewing tools such as a PDA, a web browser, remote viewers, and so forth.

System 190 may have various tracking and input modes, some of which are mentioned herein. An access control card may be integrated into system 190 to track entry, exit and pass-through of an access point or door. There may also be audio collection. Fore instance, there may be an audio detection of "I need help"and a feedback of the audio into the system 190. This detection may be indicated in the 3-D model 205 on the display 200 or indicated in the PDA. There may be camera or visual identification tracking, local area GPS, RFID, a television broadcasting location, tracking large items with a temperature system, tracking with E-fields, determining occupancy via $CO_2$ sensors, infrared (IR) tracking and imaging, such as that of refrigeration, heating and cooling equipment.

In a hospital setting of the building model 205, additional items, such as that may be observed and monitored on the display 200 may include a hospital bracelet having a transponder which includes an electronic chart for the patient. There may be an audio input on the bracelet. It may utilize RFID for location. The bracelet may include medical statistics for the patient such as information on allergies and medications. Information may be uploaded to the system while the patient is waiting for aid. Information may be downloaded through sensors in the building as the patient moves to different areas of the building.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for managing a plurality of buildings, comprising:
   providing a display to provide observations of a virtual camera;
   providing a model of each of the plurality of buildings;
   observing a model with the virtual camera;
   updating each model of each of the plurality of buildings; and
   viewing a plurality of parameters in the model of each of the plurality of buildings with the virtual camera via the display.

2. The method of claim 1, further comprising:
   providing points of interest for a building; and
   selecting a point of interest for quick navigation with the virtual camera to the point of interest in a model of the building for viewing.

3. The method of claim 1, further comprising recording observations of the virtual camera of structures, events and/or operations in and related to the system.

4. The method of claim 1, further comprising:
   evaluating the plurality of parameters; and
   determining from the evaluating the plurality of parameters a cause of a problem, if any, in a building of the plurality of buildings.

5. The method of claim 1, further comprising:
   recording the viewing of the plurality of parameters; and
   playing back the viewing of the plurality of parameters to navigate in time for analyses.

6. The method of claim 5, comprising placing the plurality of parameters in the model.

7. The method of claim 6, comprising displaying the model in a three-dimensional rendered format for two-dimensional displaying.

8. The method of claim 6, comprising displaying the model in a three-dimensional format for three-dimensional displaying.

9. A building management system comprising:
   a building model;
   a processor connected to the building model module;
   a building data module connected to the processor;
   a user interface connected to the processor; and
   a recorder and player connected to the processor; and
   wherein the user interface comprises a virtual camera for observing the building model and a display for viewing observations from the virtual camera.

10. The system of claim 9, further comprising:
    a linking module connected to the processor; and
    wherein the linking module is connected to at least one building.

11. The system of claim 10, wherein the building model is a three-dimensional representation of the at least one building.

12. The system of claim 11, wherein a space of the building model may be entered with the virtual camera.

13. The system of claim 12, wherein:
points of interest of a space are available for prompt access at the user interface; and
an adequate viewing position of the point of interest is available via the virtual camera and the display.

14. The system of claim 12, wherein the linking module is connected to a plurality of buildings.

15. The system of claim 14, wherein the linking module is connected to a building controller of each of the plurality of buildings.

16. The system of claim 14 wherein each of the plurality of buildings comprises:
a plurality of building control devices; and
a building controller connected to the plurality of building control devices.

17. The system of claim 16, wherein the plurality of building control devices comprises:
a face recognition system;
an RFID reader;
temperature sensors;
valve actuators;
video cameras;
access controllers;
lighting devices; and/or
smoke detectors.

18. The system of claim 17, wherein the linking module is connected to the plurality of buildings via an internet connection.

19. A building management system comprising:
a controller;
a plurality of building control devices connected to the controller; and
a workstation connected to the controller; and
wherein the workstation comprises a virtual camera and a display for providing views from the virtual camera.

20. The system of claim 19, further comprising a recording and playback mechanism, connected to controller.

21. The system of claim 20, further comprising a building model module connected to the controller.

22. The system of claim 21, further comprising:
points of interest at the building available for navigating to and viewing via the virtual camera on the display at the workstation; and
wherein the navigating is based on a lattice.

23. The system of claim 19, wherein the workstation comprises:
a three-dimensional rendering of two-dimensional views on the display; and
a keyboard connected to the display.

24. A building management system comprising:
a building model database;
a processor connected to the building model database and to a controller of at least one building; and
a user interface connected to the processor; and
wherein:
the building model database contains a model of the at least one building
the at least one building is monitored via the model of the at least one building;
the user interface comprises a virtual camera and a display for revealing an observation of the virtual camera; and
the virtual camera is for observing one or more items in the model of the at least one building.

25. The system of claim 24, wherein:
an item is an environmental condition; and
the environmental condition is one or more items of a group comprising room temperature, wall temperature, airflow, airflow temperature, lighting, humidity, air quality, and electromagnetic radiation.

26. The system of claim 25, wherein the virtual camera is for observing a color of light of a space in the model of the building, which is indicative of a temperature of a space of a building.

27. The system of claim 26, wherein the virtual camera is for observing temperature values of a space of the building via observation of geometric shapes situated proximate to the respective space on the model of the building.

28. The system of claim 27, the geometric shapes situated proximate to the respective space on the model of the building further indicate temperature gradients in a space of the building.

29. The system of claim 26, wherein:
a map of the earth on the display of a scene from the virtual camera is for emanating a visible signal at a location on the map indicative of a certain condition at a building proximate to the location of the visible signal; and
the virtual camera is for zooming in on the location to observe a model of the building and receive a visual indication of a specific condition of the building.

30. The system of claim 29, wherein:
the specific condition may be one or more environmental conditions;
the visual indication is a geometrical shape having a certain color is indicative of the specific condition.

31. The system of claim 26, wherein:
the virtual camera is for observing marks indicative of air flow in a space of a building of the model; and
a color of the marks is indicative of a temperature of the air flow.

32. The system of claim 31, wherein:
the user interface further comprises a mechanism for selecting an item on the display; and
selecting a source of the air flow in a display of the space of the building in the model observed by the virtual camera, results in a numerical indication of temperature and an amount of air flow at the source.

33. The system of claim 24, wherein:
the user interface further comprises a mechanism for selecting an item on the display; and
the item may be an object in the model of the at least one building;
selecting an object results in one or more settings and/or indications to the virtual camera if the object is a thermostat or a sensor;
selecting an object results in one or more actions and/or indications to the virtual camera if the object is an actuator;
selecting an object results in information to the virtual camera if the object is a piece of equipment; and
selecting an object results in movement or disassembly if the object in the model of the at least one building is a part of the building.

34. The system of claim 24, further comprising a recording mechanism for recording observations of the virtual camera.

35. The system of claim 24, wherein the display can provide three-dimensional images from observations of the virtual camera.

36. The system of claim 24, wherein:
the user interface further comprises a mechanism for selecting an item on the display;

the item may be an object in the model of the at least one building; and the at least one building in model can be virtually taken apart by selecting and moving objects.

37. The system of claim 24, the virtual camera via the user interface can move through the model of the at least one building.

38. The system of claim 24, wherein:

the model comprises points of interests for a space of the at least one building;

the user interface further comprises a mechanism for selecting a point of interest on the display showing the model; and the virtual camera can promptly go to a point of interest upon selecting of a point of interest.

39. The system of claim 24, wherein the display can provide three-dimensional images from observations of the virtual camera.

40. The system of claim 24, wherein the user interface further comprises a mechanism for selecting a access control, security, auto-identification technologies, face recognition systems, environmental control and sensing systems, video cameras, lighting systems, and/or alarm systems of the least one building, on the display showing the model of the least one building.

* * * * *